United States Patent [19]

Strecker et al.

[11] 4,338,663
[45] Jul. 6, 1982

[54] CALLING INSTRUCTIONS FOR A DATA PROCESSING SYSTEM

[75] Inventors: William D. Strecker, Harvard; Thomas N. Hastings, Lexington, both of Mass.; Richard F. Lary, Colorado Springs, Colo.; David P. Rodgers, Acton; Steven H. Rothman, Bolton, both of Mass.

[73] Assignee: Digital Equipment Corporation, Maynard, Mass.

[21] Appl. No.: 188,291

[22] Filed: Sep. 18, 1980

Related U.S. Application Data

[63] Continuation of Ser. No. 954,602, Oct. 25, 1978, Pat. No. 4,241,399, which is a continuation-in-part of Ser. No. 845,416, Oct. 25, 1977, abandoned.

[51] Int. Cl.³ .............................................. G06F 9/40
[52] U.S. Cl. ..................................................... 364/200
[58] Field of Search ............................. 364/200, 900

[56] References Cited

U.S. PATENT DOCUMENTS

| | | | |
|---|---|---|---|
| 3,366,929 | 1/1968 | Mullery et al. | 364/200 |
| 3,614,740 | 10/1971 | Delagi et al. | 364/200 |
| 4,025,904 | 5/1977 | Adney et al. | 364/200 |
| 4,128,878 | 12/1978 | Yasuhara et al. | 364/200 |
| 4,205,370 | 5/1980 | Hirtle | 364/200 |

Primary Examiner—Gareth D. Shaw
Assistant Examiner—Thomas M. Heckler
Attorney, Agent, or Firm—Cesari and McKenna

[57] ABSTRACT

A digital data processing system with a central processor for responding to diverse instructions including instructions for calling subroutines. When the central processor executes a calling instruction, the central processor saves information corresponding to the operating environment for the calling routine and then utilizes corresponding information in the subroutine to establish the operating environment for the subroutine. A common return instruction at the completion of each subroutine causes the central processor to retrieve the saved operating information thereby to reestablish the operating environment for the calling routine.

10 Claims, 32 Drawing Figures

FIG. 2A

| BYTE 7 | BYTE 6 | BYTE 5 | BYTE 4 | BYTE 3 | BYTE 2 | BYTE 1 | BYTE 0 |

FIG. 2B

| WORD 3 | WORD 2 | WORD 1 | WORD 0 |

FIG. 2C

| LONG WORD 1 | LONG WORD 0 |

FIG. 2D

| QUAD WORD 0 |

ARITHMETIC SECTION

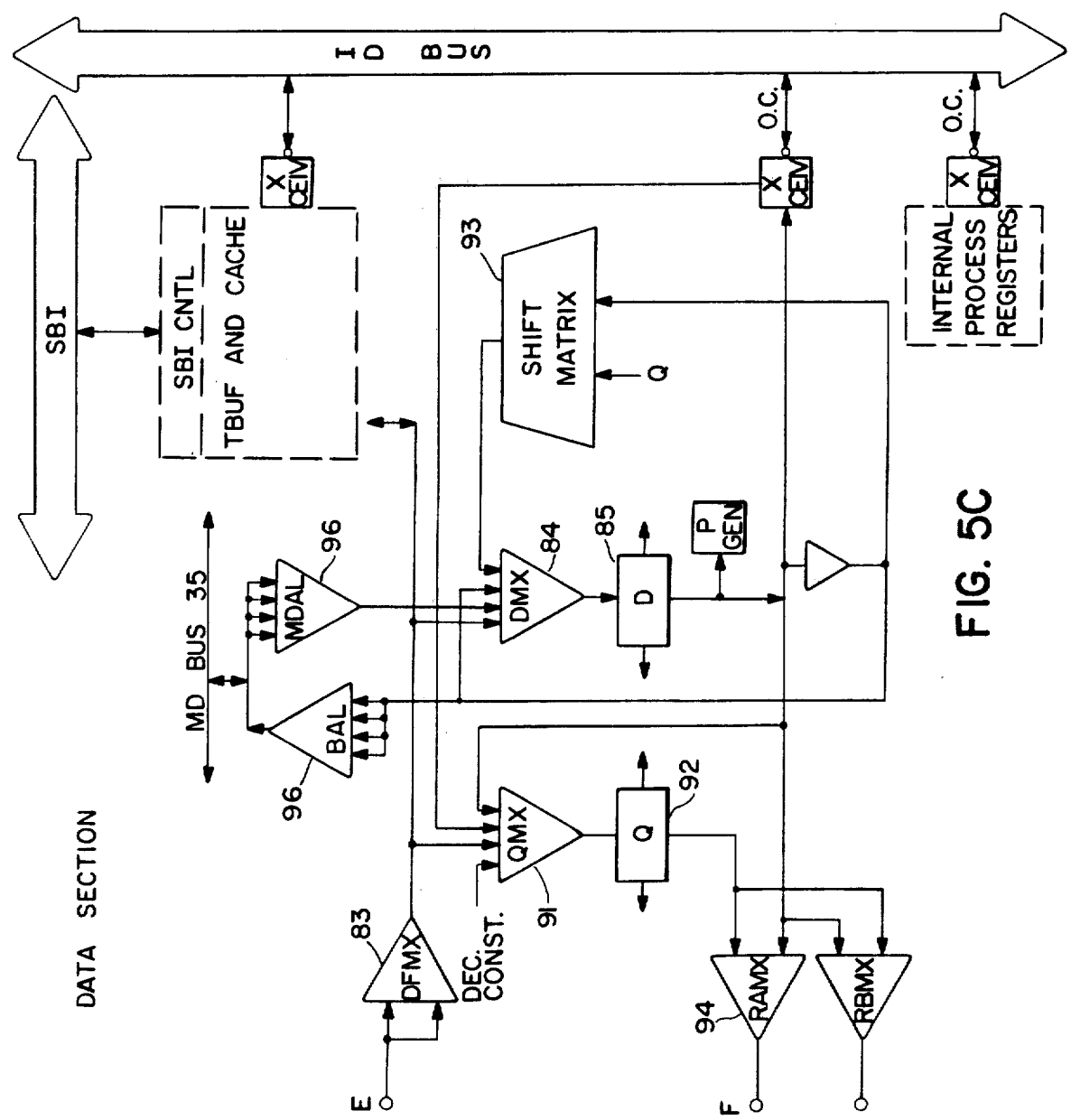

| EXECUTION ADDRESS MEMORY 71 OUTPUT SIGNALS ||||
|---|---|---|---|
| BIT POSITIONS || VALUES | MEANING |
| 1 | 0 | 0 0 | INTEGER NUMBER |
| | | 0 1 | FLOATING POINT NUMBER |
| TYPE || 1 0 | VSRC |
| | | 1 1 | ASRC |
| 3 | 2 | 0 0 | 1 BYTE |
| | | 0 1 | 2 BYTES |
| LENGTH || 1 0 | 4 BYTES |
| | | 1 1 | 8 BYTES |
| 5 | 4 | 0 0 | SELECT SPECIFIER |
| | | 0 1 | EXECUTE IF REGISTER |
| MODE || 1 0 | OPTIMIZED |
| | | 1 1 | SELECT EXECUTE |
| 7 | 6 | 0 0 | BRANCH INSTRUCTION |
| | | 0 1 | READ |
| ACCESS || 1 0 | WRITE |
| | | 1 1 | MODIFY |

FIG. 6B

| SPECIFIER DECODE LOGIC 72 |||||
|---|---|---|---|---|
| MODE | R=PC | R≠PC | QUAD | ABORT |
| 0 | 00 | 00 | 02 | 01/08 |
| 1 | 00 | 00 | 02 | 01/03 |
| 2 | 00 | 00 | 02 | 01/03 |
| 3 | 00 | 00 | 02 | 01/03 |
| 4 | 0C | 1C | -- | 1D |
| 5 | 04 | 14 | 06, 16 | 07,17,05,15 |
| 6 | 08 | 18 | | |
| 7 | 0A | 1A | | |
| 8 | 09 | 19 | | |
| 9 | 0B | 1B | | |
| 10 | 0D | 0D | | |
| 11 | 0F | 0F | | |
| 12 | 0D | 0D | | |
| 13 | 0F | 0F | | |
| 14 | 0D | 0D | | |
| 15 | 0F | 0F | | |

| C1 | 07 | A1 | 20 | 47 | C2 | 40 | 01 |
|---|---|---|---|---|---|---|---|
| 0 | 1 | 2 | 3 | 4 | 5 | 6 | 7 |

| C1 | 47 | C2 | 40 | 01 | | | |
|---|---|---|---|---|---|---|---|
| 0 | 1 | 2 | 3 | 4 | | | |

60

| DESTINATION | ARGUMENT LIST | FA |
|---|---|---|

FIG. 10A

| DESTINATION | ARGUMENT COUNT | FB |
|---|---|---|

FIG. 10B

D29. STORE A ZERO VALUE OF THE CONDITION HANDLER INTO THE NEXT AVAILABLE LOCATION ON THE MEMORY STACK.

FIG. 10C-4

CALLING INSTRUCTIONS FOR A DATA PROCESSING SYSTEM

CROSS REFERENCE TO RELATED PATENTS AND PATENT APPLICATIONS

This application is a continuation of our co-pending U.S. patent application Ser. No. 954,602 filed Oct. 25, 1978, now U.S. Pat. No. 4,241,399, and assigned to the same assignee as this application which, in turn, is a continuation-in-part of U.S. pat. application Ser. No. 845,416 filed Oct. 25, 1977 (now abandoned).

U.S. Pat. No. 3,614,740 issued Oct. 19, 1971 for a DATA PROCESSING SYSTEM WITH CIRCUITS FOR TRANSFERRING BETWEEN OPERATING ROUTINES, INTERRUPTION ROUTINES AND SUBROUTINES and assigned to the same assignee as the present invention.

U.S. Pat. No. 3,614,741 issued Oct. 19, 1971 for a DATA PROCESSING SYSTEM WITH INSTRUCTION ADDRESSES IDENTIFYING ONE OF A PLURALITY OF REGISTERS INCLUDING THE PROGRAM COUNTER and assigned to the same assignee as the present invention.

U.S. Pat. No. 3,710,324 issued Jan. 9, 1973 for a DATA PROCESSING SYSTEM and assigned to the same assignee as the present invention.

U.S. Pat. No. 3,999,163 issued Dec. 21, 1976 for a SECONDARY STORAGE FACILITY FOR DATA PROCESSING SYSTEM and assigned to the same assignee as the present invention.

U.S. patent application Ser. No. 954,601 filed Oct. 25, 1978, now U.S. Pat. No. 4,232,366, for a BUS FOR A DATA PROCESSING SYSTEM WITH OVERLAPPED SEQUENCES assigned to the same assignee as the present invention which application is a continuation-in-part of U.S. patent application Ser. No. 845,415 filed Oct. 25, 1977 for a BUS FOR A DATA PROCESSING SYSTEM WITH OVERLAPPED SEQUENCES, now abandoned.

BACKGROUND OF THE INVENTION

This invention generally relates to digital data processing systems. More specifically it relates to a central processor for use in such data processing systems.

A digital data processing system comprises three basic elements: namely, a memory element, an input-output element and a processor element. The memory element stores information in addressable storage locations. This information includes data and instructions for processing the data. The processor element transfers information from the memory element. It interprets the incoming information as either data or an instruction. An instruction includes an operation code that specifies, in coded form, the operation to be performed by the processor. An instruction may also include information that specifies one or more operands. This information is called an operand specifier.

The processor element in a digital data processing system processes data in accordance with a program that comprises a number of instructions. This program is stored in the memory element. The memory element also may include other programs, known as subroutines, which perform specific functions. A program, designated a calling routine, can utilize a subroutine by incorporating a subroutine calling instruction. There are many types of calling instructions that are utilized in prior data processing systems. Generally they can be characterized as specifying a starting address for the subroutine and return information to enable the subroutine to transfer control back to the calling routine when the subroutine has been completed.

When a calling routine transfers to a subroutine, basic information must be provided or retained. For example, it is necessary to establish the environment in which the subroutine is to operate. Part of the environment for the subroutine includes addresses to be used by the subroutine for obtaining input data and for transmitting output data. Other information including trap enabling information and interruption routine information, also must be saved. Prior data processing systems normally established this environment by explicitly transferring information under the control of instructions in the subroutine.

It also is necessary to save the state of the processor when the calling routine executes the calling instruction. This includes the transfer of information in specified registers that might be used by the subroutine into memory locations and the transfer of the argument list pointer which specifies the first location in the argument list to the subroutine. In prior systems, processor state also is preserved explicitly by use of instructions in the subroutine or the calling routine or both.

Therefore a portion of the subroutine must be devoted to instructions for saving the process state and for establishing the subroutine environment. Moreover the state of the machine must also be re-established at the end of the subroutine explicitly by the use of further instructions. All of these explicit transfers are in the form of housekeeping or overhead. The requirement to include specific instructions in the subroutine to perform this overhead or housekeeping functions complicates the subroutines. Moreover it increases the number of memory locations that the subroutine requires and, as each instruction must be executed separately, contributes to the overall time that is necessary to execute a subroutine.

Therefore, it is an object of this invention to provide a calling instruction and a central processor for responding to that instruction that simplifies the transfer of operations from a calling routine to a subroutine.

Another object of this invention is to provide an instruction for transferring operations to a subroutine that automatically preserves the state of the central processor and enables that state to be restored easily.

Another object of this invention is to provide a subroutine calling instruction that automatically establishes the environment for the subroutine and re-establishes the environment for the calling routine.

SUMMARY OF THE INVENTION

In accordance with this invention a subroutine calling instruction includes two operand specifiers. One specifier identifies a representation of an argument list to be passed from the calling routine to the subroutine; the other, a predetermined location in a subroutine. In response to this calling instruction, the central processing unit automatically preserves the state of the central processor at the time of the calling instruction by saving information that defines the state in memory. Moreover the central processor unit automatically utilizes information in the subroutine in at least the predetermined location to establish the environment under which the subroutine will operate. Upon completion of the subroutine a return instruction is executed. The central processing unit responds to this instruction by reestablishing the environment and state of the calling routine using the information that was saved during the transfer to the subroutine.

This invention is pointed out with particularity in the appended claims. The above and further objects and advantages of this invention may be better understood by referring to the following description taken in conjunction with the accompanying drawings.

BRIEF DESCRIPTION OF THE DRAWINGS

FIGS. 2A through 2D pictorially depict data types that are utilized in conjunction with a specific embodiment of this invention;

FIG. 5 and FIGS. 5A through 5C constitute a block diagram of the data paths shown in FIG. 3;

FIGS. 8C-1 through 8C-3, is a flow diagram that defines the operation of the central processor shown in FIGS. 1 and 3 in response to that instruction;

FIGS. 9A depicts another format of this instruction shown in FIG. 8A as it appears in one state of the instruction buffer shown in FIG. 6A; FIG. 9B depicts the instruction during an intermediate state of the processing of the instruction; FIGS. 9C-1 and 9C-2, is a flow diagram that defines the operation of the central processor shown in FIGS. 1 and 3 in response to that modified instruction; and FIGS. 10A and 10B illustrate the format for instructions that are useful in calling subroutines while FIG. 10C, comprising FIGS. 10C-1, 10C-2A, 10C-2B, 10C-3 and 10C-4, is a flow diagram that defines the operation of the central processor shown in FIGS. 1 and 3 in response to those instructions.

DESCRIPTION OF AN ILLUSTRATIVE EMBODIMENT

A. General Discussion

Figure 1:
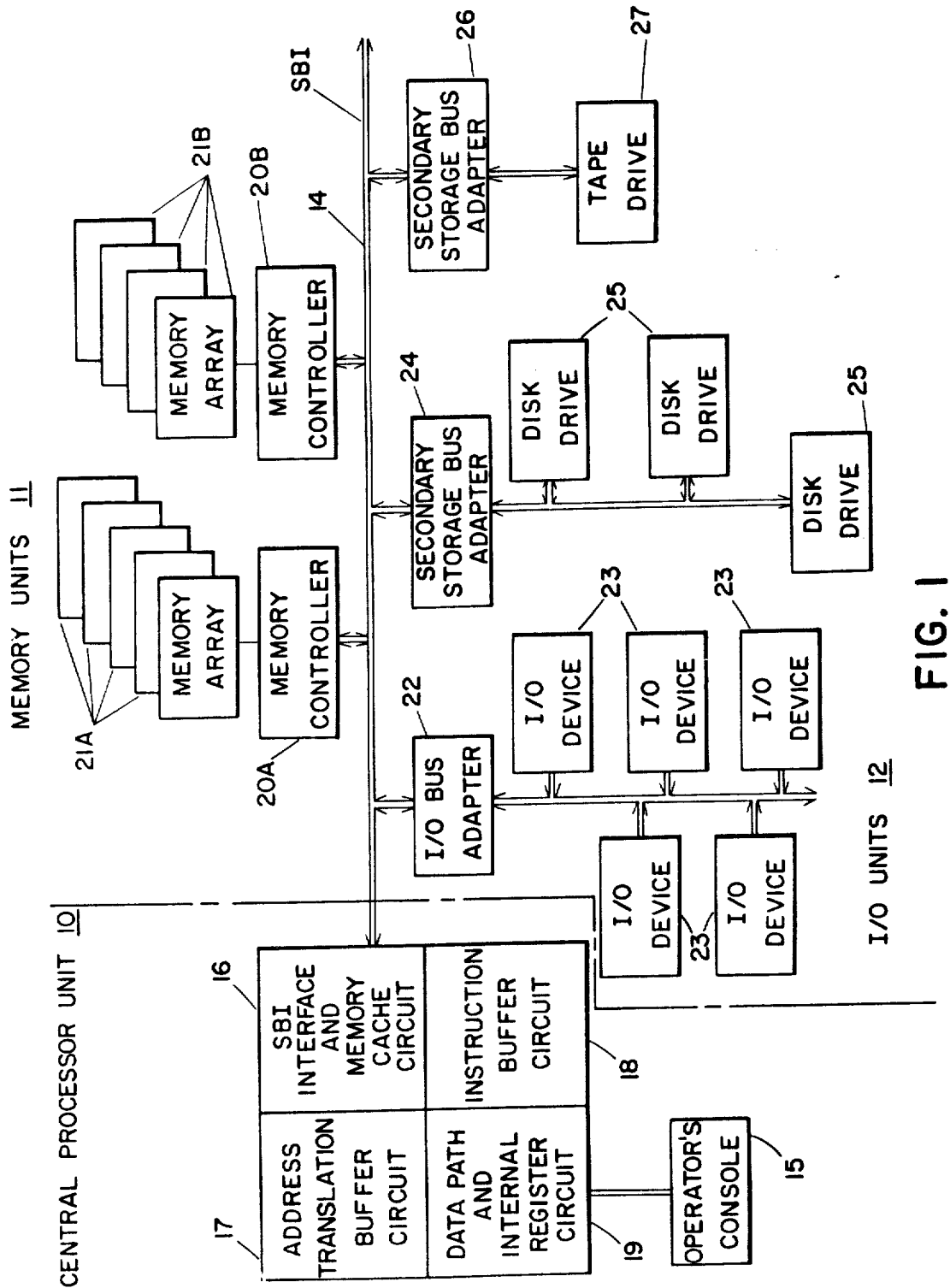
FIG. 1 is a block diagram of a digital data processing system constructed in accordance with this invention.

Referring to FIG. 1, the basic elements of a data processing system that embodies our invention comprise a central processor unit 10, memory units 11 and I/O units 12. A synchronous backplane interconnection (SBI) 14 interconnects the central processor unit 10, memory units 11 and I/O units 12.

The central processor unit 10 comprises an operator's console 15, an SBI interface and memory cache circuit 16, an address translation buffer circuit 17, an instruction buffer circuit 18 and a data path and internal register circuit 19. The SBI interface and memory cache circuit 16 provides the necessary interfacing circuitry for transferring information over the SBI 14 to the memory units 11 and I/O units 12. The circuit 16 receives all data from the memory and all address translations from the buffer circuit 17. It includes an associative memory, or cache. Anytime data is written into the cache memory in the circuit 16 from the data path and internal register circuit 19, that data is also written into a corresponding location in the memory unit 11.

This specific embodiment of the central processor 10 operates with virtual addresses. The address translation buffer circuit 17 converts the virtual address to physical addresses which the memory cache circuit 16 uses either to determine whether it contains data from the corresponding location or to initiate a transfer from the corresponding actual location in the memory units 11. The instruction buffer circuit 18 includes, as described later, means for storing instructions, or portions thereof, as they are retrieved either from the cache memory directly or from the memory units 11.

The operator's console 15 serves as the operator interface. It allows the operator to examine and deposit data, halt the operation of the central processor unit 10 or step it through a sequence of program instructions. It also enables an operator to initialize the system through a bootstrap procedure and perform various diagnostic procedures on the entire data processing system.

In FIG. 1, the memory units 11 comprise two memory controllers 20A and 20B. Each memory controller connects to a plurality of memory arrays. Specifically, memory controller 20A connects to memory arrays 21A while memory controller 20B connects to memory arrays 21B. The operation of the memory unit 11 is disclosed in detail in the copending U.S. patent application Ser. No. 954,601. Several types of I/O units 12 are shown. An I/O bus adapter 22 interconnects various input/output (I/O) devices 23, such as teletypewriters, to the bus 14. The interconnection, operation and transfer of signals between the I/O bus adapter 22 and the I/O devices 23 is disclosed in U.S. Pat. No. 3,710,324.

Two other I/O units 12 provide a secondary storage facility for the data processing system. They include a secondary storage bus adapter 24 and a plurality of disk drives 25. There is also shown a secondary storage bus adapter 26 and a tap drive 27. The interconnection of the secondary storage bus adapters 24 and 26 and their respective disk drives 25 and tape drive 27 is disclosed in the foregoing U.S. Pat. No. 3,999,163.

Figures 8A, 8B:
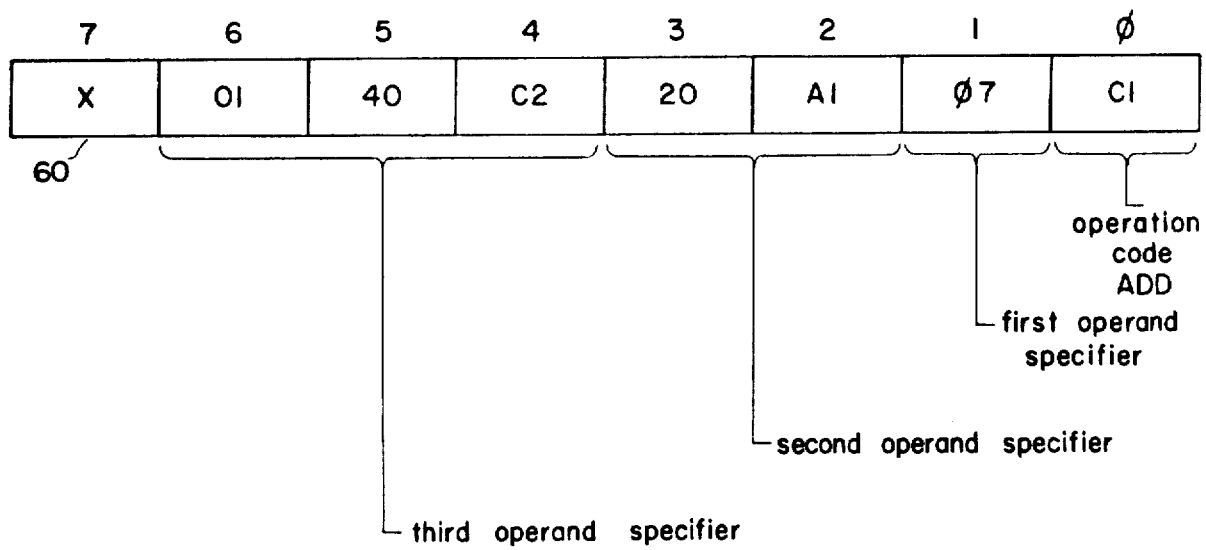
FIG. 8A depicts the format of a specific instruction.
FIG. 8B depicts certain information that is derived from that instruction.
Figures 1, 8C:
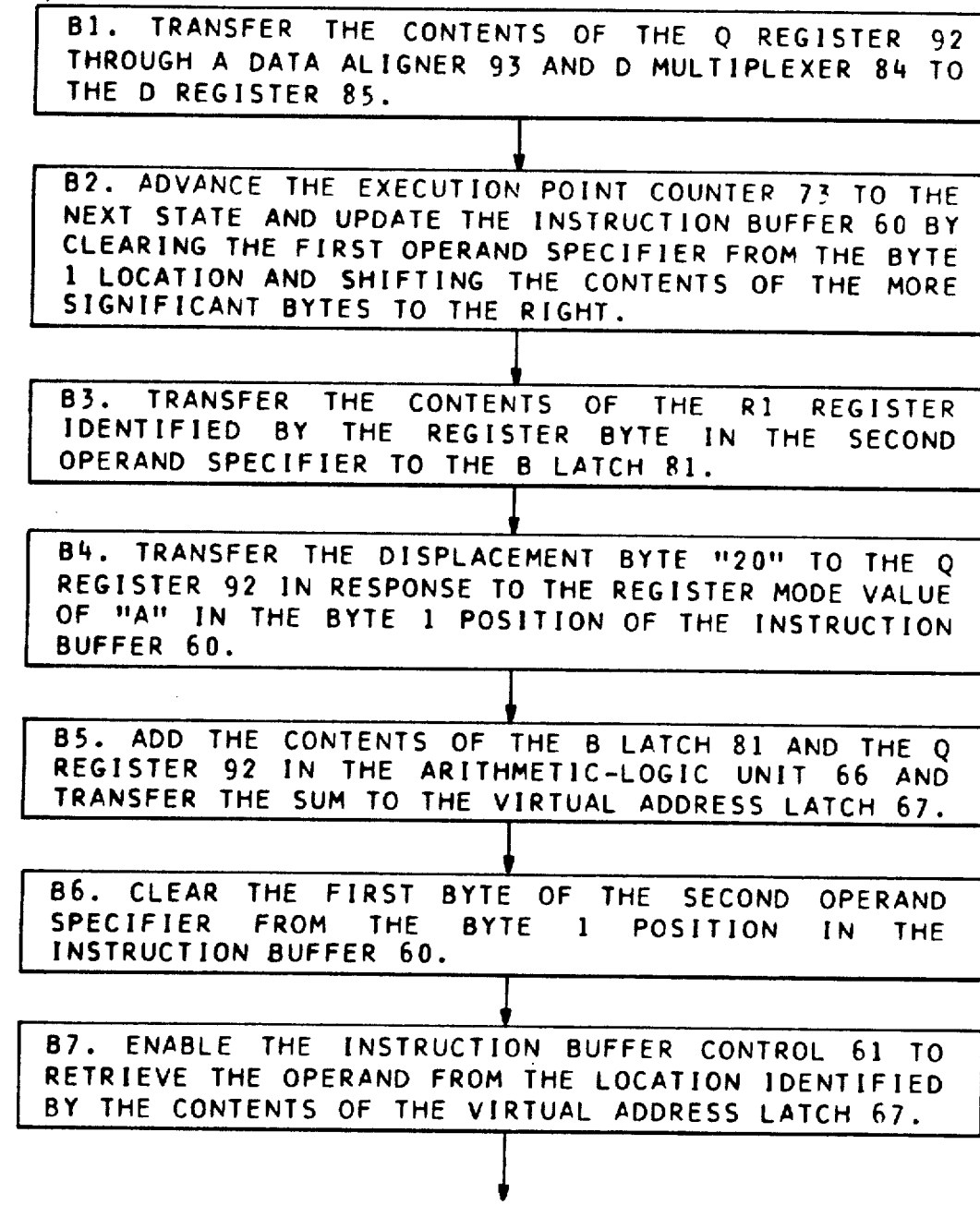
FIG. 8C, comprising
Figures 2, 8C:
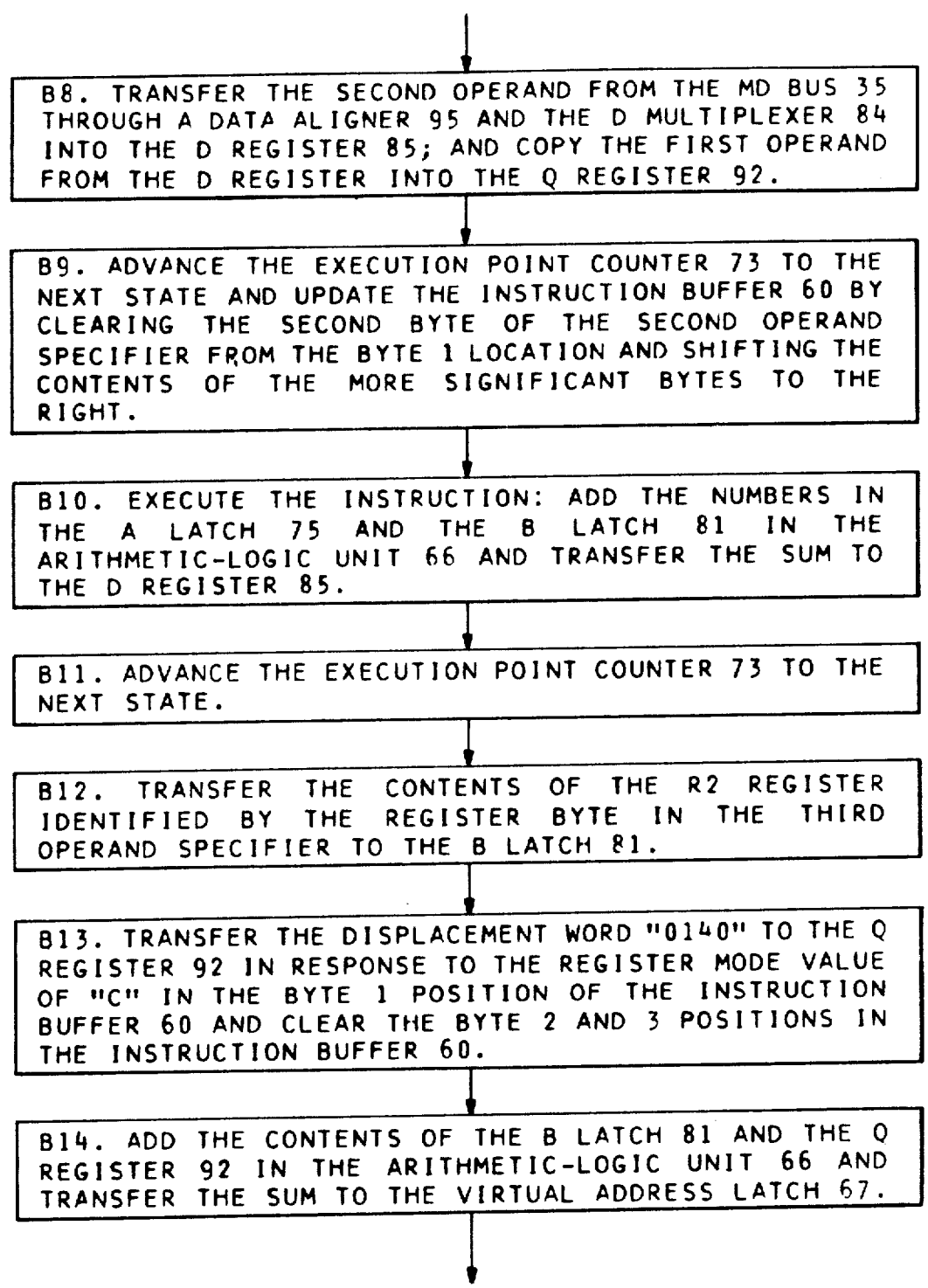
Figures 3, 8C:
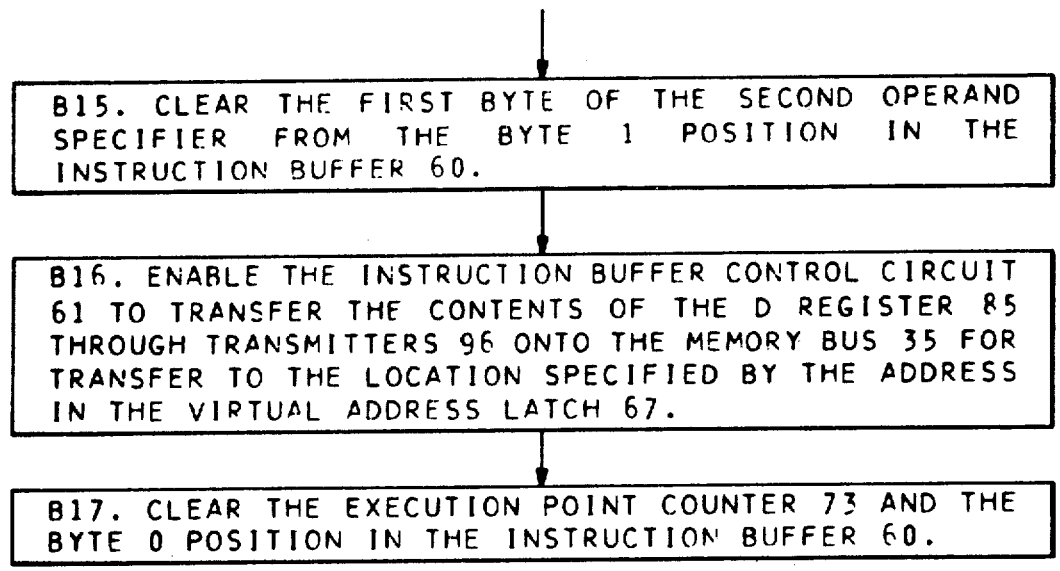

U.S. Patent application Ser. No. 954,601 describes the interactions of the elements over the SBI 14. For purposes of the following discussion, it will be helpful to summarize these interactions and to define specific terms including the designation of the data items, or groups, which this specific embodiment of the invention can process. The basic, or most elementary, information group is a byte. This is shown in FIG. 2A and it includes eight bits in this specific embodiment of the invention. In order of increasing size, the next information group is a word, which is shown in FIG. 2B as comprising two bytes. In FIG. 2C there is depicted a "longword" that comprises two consecutive words or four consecutive bytes. FIG. 2D depicts a "quadword" which comprises two consecutive longwords, i.e., four consecutive words or eight consecutive bytes. Any transfer of information over the SBI 14 involves a longword.

The SBI 14 is time-division multiplexed and includes signal paths for carrying information and control signals. In terms of this invention, the information includes control information and data. Control information is the intelligence used to control and provide the basis for data processing whereas data is program-generated information which is the object of the processing itself.

Each unit that connects to the SBI is called a nexus. The specific system shown in FIG. 1 includes six nexuses. A nexus is defined further in terms of its function during an exchange of information. At least two SBI transactions are necessary to exchange information between two nexuses. During a first transaction, one nexus, as a transmitting commander nexus, transmits command and address information to all the nexuses. This nexus is called a transmitting nexus because it is driving the SBI 14 and a commander nexus because it has transmitted the command and address information. During this transaction all other nexuses are receiving nexuses. However, only one receiving nexus will respond to the address information. That nexus is a responder nexus and it transmits a confirmation of receipt of the command and address information at a fixed interval after the commander nexus transmits that information. Thus, if the central processor unit 10 needs to retrieve data from the memory controller 20A, the central processor unit 10 becomes a commander nexus and transmits a read command and an address to which the memory controller 20A will react initially as a receiving nexus and then as a responder nexus.

After some interval, the memory controller 20A will be prepared to send the retrieved data to the central processor unit 10. As described in the foregoing copending patent applications, it seeks control of the SBI 14. When it gains control, the memory controller 20A becomes a transmitting responder nexus and transfers the requested data onto the SBI 14 for transfer to the central processor unit 10. During this transaction, the central processor unit 10 is a receiving commander nexus.

Similar transactions occur for any information exchange between any two nexuses, although the memory controllers normally function only as responder nexuses and the central processor unit normally functions only as a commander nexus. For purposes of this invention, it will be apparent that typical information exchanges will involve the transfer of instructions, operand specifiers and related information, and data to the central processing unit 10 and the transfer of processed data back to the memory unit 11.

The SBI interface and memory cache circuit 16, as noted, includes a cache, or associative, memory. For transfers of information to the central processing unit 10, the cache memory first will be interrogated to determine whether it already contains the required information. If it does, no exchange of information with the memory unit 11 is necessary. If the cache memory does not contain that information, the SBI interface circuitry initiates a memory reading operation that involves a quadword. This information is transferred into the cache memory along with the physical addresses in the memory units 11 for that information. Simultaneously, the information is routed to the instruction buffer circuit 18 if an instruction is being transferred or to the data path and internal register circuit 19 if other information is being transferred. If the central processor 10 transfers information back to the memory unit 11, it transfers the information into the cache memory. The SBI interface and memory cache circuit 16 then initiates the necessary SBI transactions to first transmit the necessary command and address information and then the data. The details of these transactions are disclosed in U.S. patent application Ser. No. 954,601. An understanding of these details is not necessary for an understanding of this invention.

Figure 3:
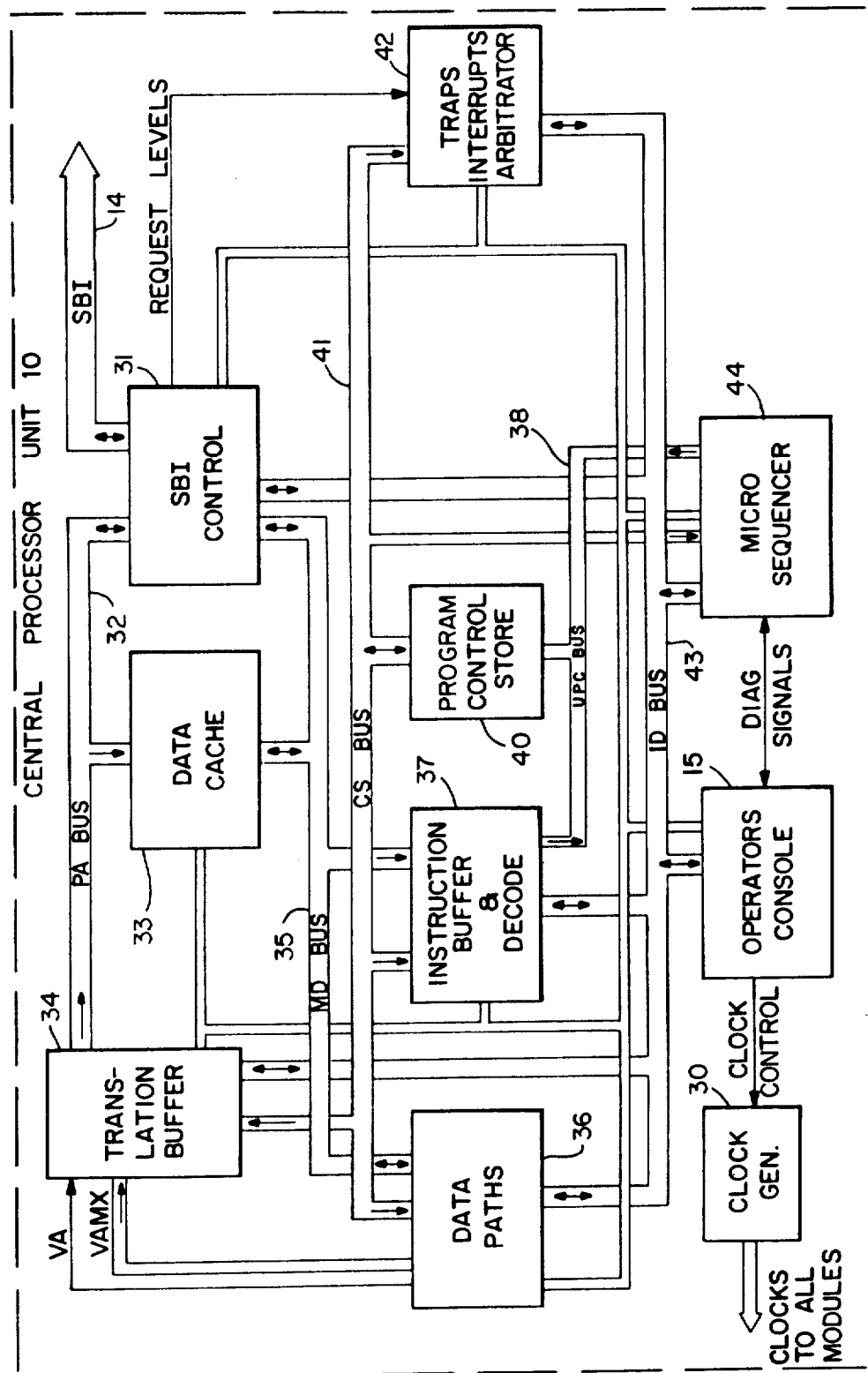
FIG. 3 is a block diagram of the central processor shown in FIG. 1.

FIG. 3 is a generalized block diagram of the central processor unit 10. It depicts the operator's console 15, the SBI 14 and the other circuits that constitute the SBI interface and memory cache circuit 16, the address translation buffer circuit 17 and the instruction buffer circuit 18. More specifically, the central processor unit 10 operates under timing established by a clock generator 30. Specific timing becomes more apparent in the discussion related to the flow diagrams. The SBI interface and memory cache circuit 16 comprises an SBI control circuit 31 that connects to the SBI 14 and to a physical address (PA) bus 32. The PA bus 32 connects to a data cache circuit 33 and to a translation buffer 34. The translation buffer 34 converts virtual address (VA) information and other control information into a physical address that is transmitted simultaneously to the SBI control 31 and data cache 33. Data from the data cache 33 or from any other location on the SBI 14 that passes through the SBI control 31 is conveyed to other elements in the central processor unit 10 over a memory data (MD) bus 35. These units include a data path 36 and an instruction buffer and decode circuit 37.

A microprogram control (UPC) bus 38 conveys signals from the instruction buffer and decode circuit 37 to a program control store 40. The program control store 40 then generates various control signals onto a CS bus 41, and this bus conveys signals to the translation buffer 34, the data paths 36, the instruction buffer and decoder 37 and to a traps-interrupts arbitrator circuit 42. These circuits and the operator's console 15 communicate over an instruction data (ID) bus 43 with a microsequencer 44 that controls the sequence of operations in response to microinstructions stored in the program control store 40.

The microsequencer 44 establishes a retrieval state for obtaining an instruction. A program counter that is located in the data paths 36 generates a beginning address of the next instruction to be retrieved. This address passes from the data paths 36 through the translation buffer 34 onto the PA bus 32. If the data cache 33 contains valid information in a location corresponding to the specified physical address, it transmits data over the MD bus 35 to the instruction buffer and decode circuit 37. As the instruction buffer and decode circuit 37 decodes the instruction, the microsequencer 44 establishes other data paths that transfer other information to the translation buffer 34 thereby to transfer other data into general purpose registers in the data paths 36 from either the data cache 33 or, after a retrieval from the memory units 11 or other memory locations on the SBI 14, from the SBI control 31. One such general purpose register serves as the program counter. If the instruction requires data to be transferred to a physically addressed location, the microsequencer 44 establishes the data paths that are necessary to transfer signals to the translation buffer 34, thereby to form the physical address, and to transfer the data simultaneously to the data cache 33 and to the SBI control 31. During any such transfer the SBI control 31 initiates an exchange with the specified memory location.

Figure 4:
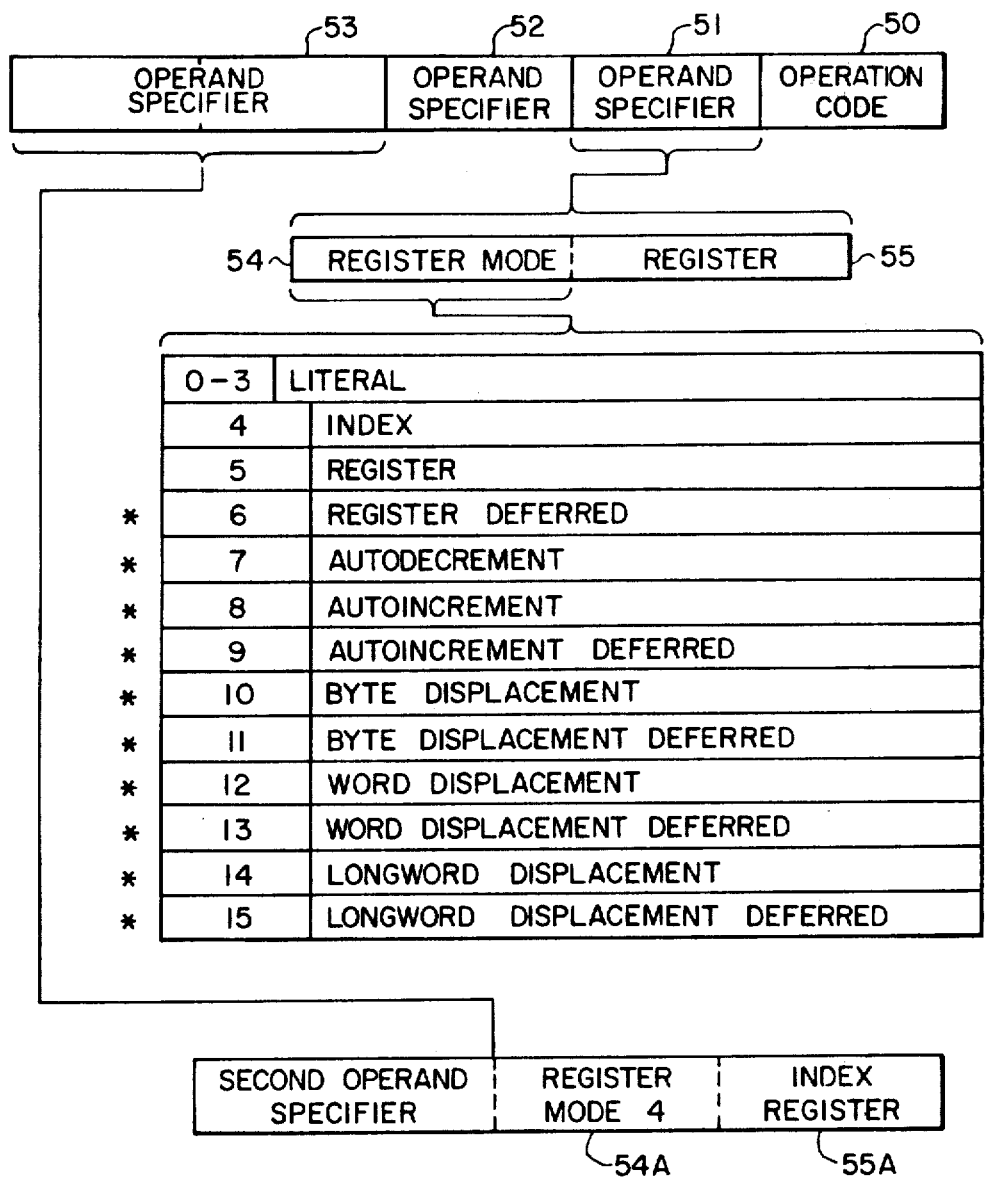
FIG. 4 depicts the format and organization of an instruction that can be processed in the central processor shown in FIGS. 1 and 3.

FIG. 4 depicts a typical instruction that can be processed by the central processor unit 10 shown in FIG. 3. The instruction, shown at the top of FIG. 4, includes an operation code 50 that is depicted as one byte in length. It will become apparent from the following discussion, however, that the central processor unit 10 can be adapted to process multiple-byte operation codes. In this specific instruction three operand specifiers 51, 52 and 53 follow the operation code in sequence. The operand specifiers 51 and 52 each comprise one byte of information whereas the operand specifier 53 comprises two bytes. The format of a single-byte operand specifier also is shown in FIG. 4. It comprises two fields. The high-order bits constitute a register mode field and the low-order bits constitute a general purpose register address field. The general purpose register address field specifies one of the general purpose registers that is located in the data paths circuit 36 shown in FIG. 3 and shown in more detail in FIG. 5B. In this specific embodiment the bytes comprise 8 bits so 4 bits are available for each of the register mode and register address fields, thereby enabling any one of sixteen general purpose registers to be addressed by an operand specifier.

If the two most significant bits of the register mode field 54 are zeroes, (register modes 0 through 3), the operand specifier 51 includes the operand, i.e., a literal, which can comprise any data value up to 6 bits representing decimal numbers from 0 through 63.

If the register mode field 54 contains a decimal value of 4, as shown in the register mode field 54A for the operand specifier 53, an index mode is specified. When the register mode field, such as register mode field 54A specifies an indexed addressing mode, the corresponding register field 55A identifies one of the general purpose registers that is to be used as an index register in processing the operand specifier. A secondary operand specifier is included in the instruction for indexed addressing. This secondary operand specifier provides a base address to which the contents of the designated index register are added. A more detailed description of indexed addressing is included later.

When the register mode field 54 contains a "5", register mode addressing is specified. In this mode the general register addressed by the register field contains the operand.

For each of register modes 6, 7 and 8, the specified register contains the memory address for the operand. In mode 6 the designated register contains the address of the operand. In register mode 7 the contents of the designated general purpose register are first decremented before ascertaining the address; in mode 8 the designated general purpose register contents are incremented after the register is used to determine the address. Register mode 9 corresponds to register mode 8, except that the contents of the designated general purpose register specify the address in memory at which the operand address will be found rather than the operand itself.

Modes 10 through 15 are all displacement modes. In the displacement mode the displacement value, which may comprise a byte, word, or longword in modes 10, 12 and 14 respectively, is added to the contents in designated general purpose register to obtain the operand address. Corresponding operations occur in modes 11, 13 and 15 except that the sum of the displacement value and general purpose register contents identifies a memory address at which the address of the operand can be found.

In each of the foregoing modes 5 through 15, the register field 55 of the operand specifier can designate any of the general registers which include the program counter. Moreover, in each of modes 0 through 3, the operand is a literal while in mode 5 the operand is in a designated general purpose register.

B. Specific Discussion

(1) Initial instruction processing

Figure 5:
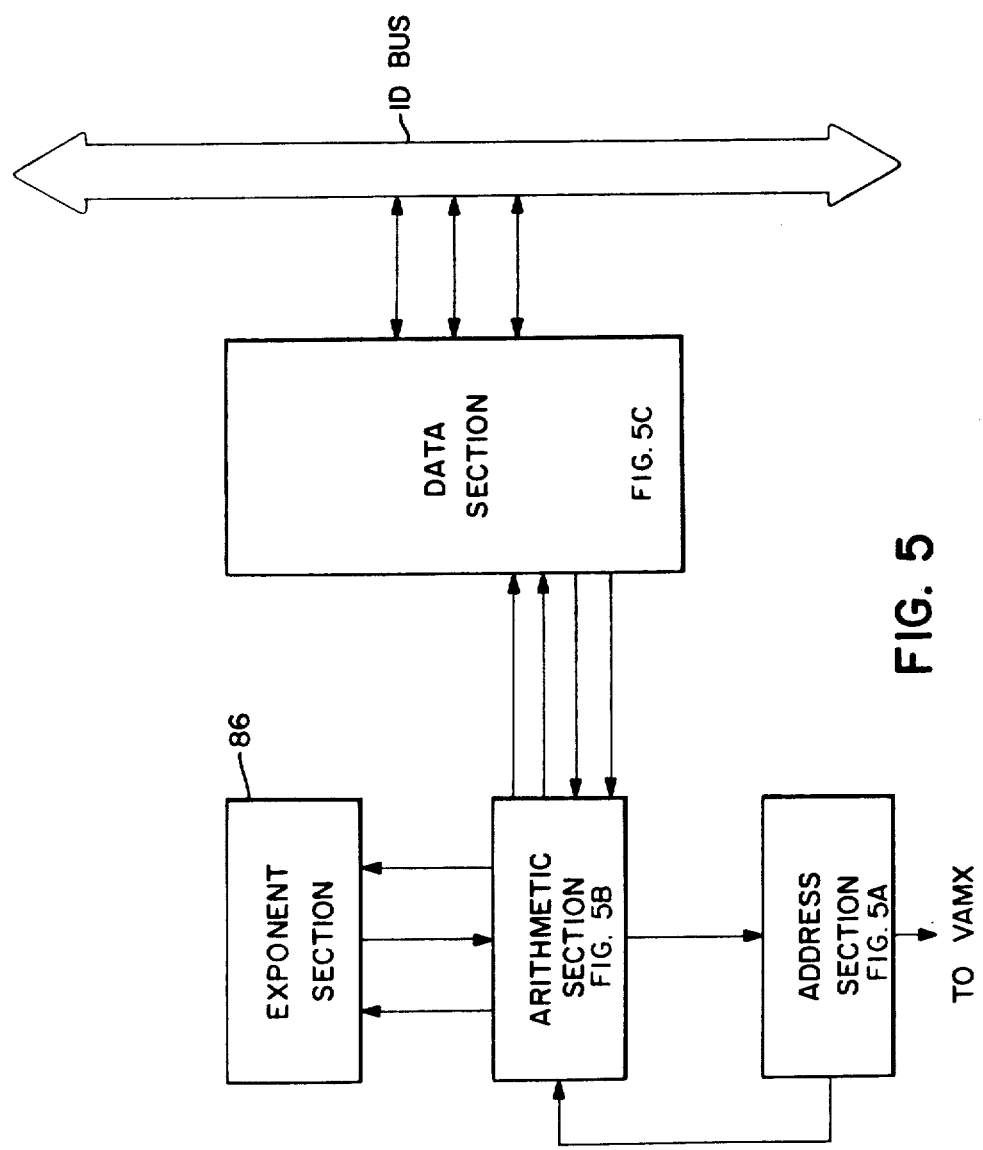
Figure 6A:
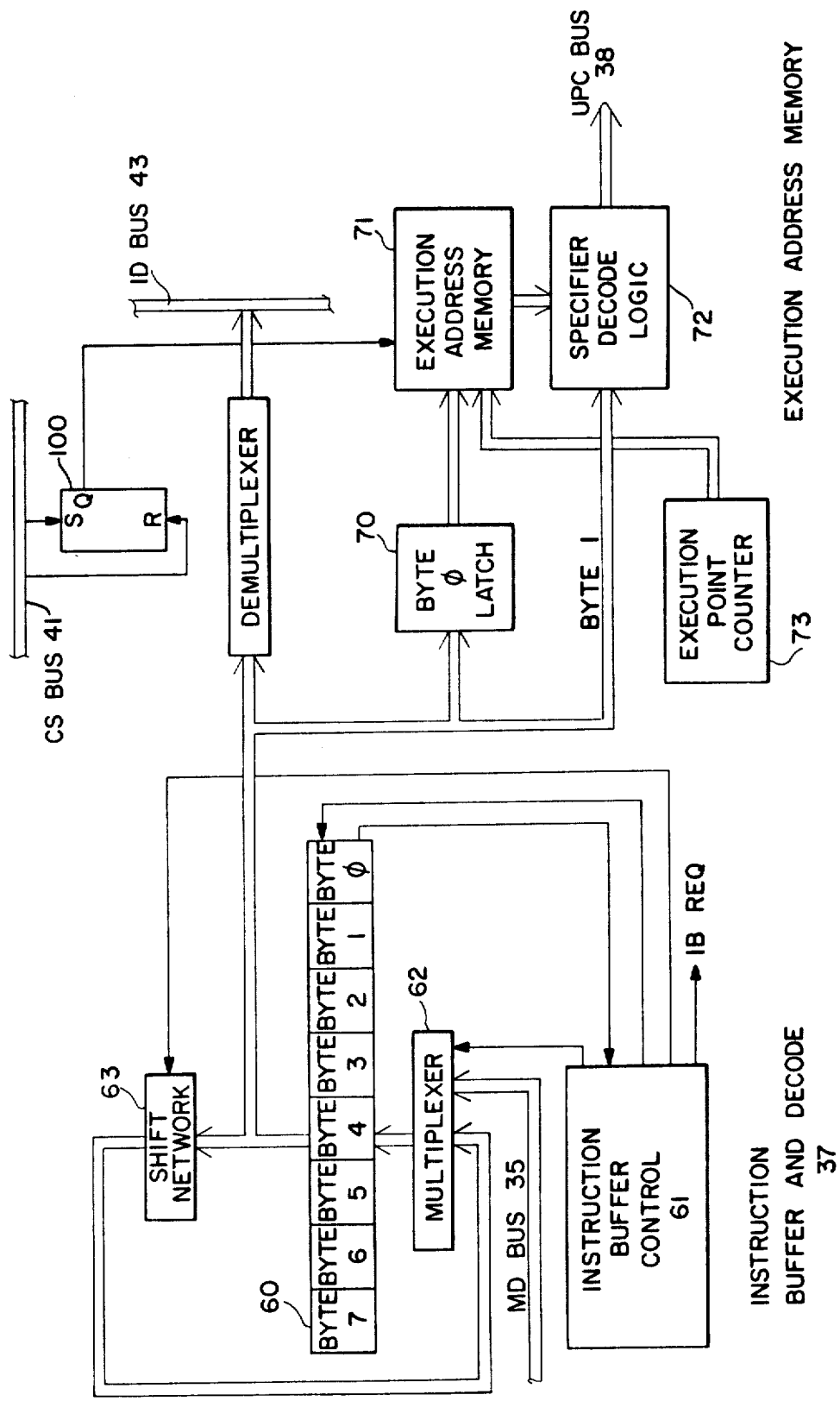
FIG. 6A is a block diagram of the instruction buffer and decode circuits shown in FIG. 3 and FIGS. 6B and 6C depict certain signals that are transmitted by the circuits shown in FIG. 6A.

FIGS. 5 and 6A disclose, respectively, further details of the data paths 36 and the instruction buffer and decode circuit 37. There are some basic operating characteristics of the data paths 36 of this specific embodiment which optimize the performance of the central processor unit 10. A detailed knowledge of operations in the data paths 36, however, is not necessary to an understanding of this invention; so they are merely summarized. In FIG. 6A, the instruction buffer and decode circuit 37 comprises an instruction buffer 60 that stores eight consecutive bytes. Transfers into the instruction buffer 60 are made in response to signals from an instruction buffer control circuit 61. Each byte position in the instruction buffer 60 contains a validity bit position that indicates whether the data in the remainder of that byte position is valid (i.e., the validity bit position is cleared once the byte is no longer needed). If this validity bit indicates that the data in a specific one or more byte positions is no longer valid, the instruction buffer control circuit 61 generates an IB REQ signal that requests a transfer of data from the data cache 33 in FIG. 1 to the instruction buffer 60. The requested information arrives over the MD bus 35 either from the data cache 33 or through the SBI control 31. Other circuitry in the instruction buffer control circuit 61 detects the highest order byte position with invalid data and shifts higher order bytes into those byte positions to replace the invalid data. During these transfers, data in all higher order bytes is altered.

The transfers over the MD bus 35 are longwords (FIG. 2C) that pass through a multiplexer 62. A shift network 63 also is associated with the output of the instruction buffer 60 and the input of the multiplexer 62 for use in shifting the data bytes. Thus, the instruction buffer control circuit 61 properly routes the appropriate information into the designated byte positions in the instruction buffer 60. In effect, the instruction buffer control circuit 61 thereby continuously fills the instruction buffer 60 with valid data.

The response of the central processor unit 10 to a typical instruction can now be considered. The instruction buffer control 61 issues an instruction buffer request (IB REQ) signal. At this time, the contents of a program counter register 64, that contains a virtual address, pass through a B multiplexer (BMX) 65 and an arithmetic-logic unit (ALU) 66 to both a virtual address (VA) latch 67 and an instruction buffer address (IBA) latch 68. The virtual address latch 67 stores the instruction address for purposes of establishing the physical address with the circuitry in the translation buffer circuit 34. The instruction buffer address latch 68 is utilized during the subsequent transfer of information into the instruction buffer 60 (FIG. 6A) as information is used from that buffer and becomes obsolete. The foregoing operation constitutes step A1 in FIG. 7.

In step A2, the incoming information that appears on the MD bus 35 in FIG. 6A constitutes all or part of the instruction. This information is transferred through the multiplexer 62 in response to signals from the instruction buffer control circuit 61 and into the instruction buffer 60. At this time, the byte 0 position of the instruction buffer 60 contains operation code information. At this time in the discussion it is assumed that each operation code comprises only one byte.

If only byte 0 position in the instruction buffer 60 contains the operation code, the byte 1 position will contain all or part of a first operand specifier, assuming the instruction includes such an operand specifier. Byte 0 is stored in a byte 0 latch 70 that controls an execution address memory 71. The contents of the byte 1 position are applied to a specifier decode logic circuit 72 along with output signals from the execution address memory 71.

The execution address memory 71 stores a table which includes entries for every instruction that can be executed by the central processing unit 10. The location of a particular entry in that table is derived from the operation code signals from the byte 0 latch 70 and from signals from an execution point counter 73. Initially the execution point counter 73 is set to a reference number (e.g. 0). As each operand specifier in an instruction is decoded, the execution point counter 73 is advanced to define a new table entry. Each entry in the table identifies certain characteristics of the operand specifier such as the size of the expected data item and whether the operand specifier identifies a location from which or to which the operand is to be transferred. Signals for each selected table entry pass to the specifier decode logic 72 to control a portion of the starting address that the microsequencer 44 uses to establish the data paths and sequence for decoding the operand specifier. The UPC bus 38 carries the signals from the specifier decode logic 72 to the microsequencer 44.

FIG. 6B depicts operand specifier characteristics that are retained in a specific embodiment of the execution address memory 71. The two low-order bits from the execution address memory 71 specify the type of data item that is involved; normally a data item comprises either an integer number or a floating point number. The next two bits in order indicate the length of the operand. The following two bits specify the operation that is to occur. The last two bits determine information concerning access. For example, if the byte 0 latch 70 and execution point counter 73 identify a location containing the binary number 01001000, the corresponding operand specifier designates a longword integer number that is to be retrieved from memory. As previously stated, there is an entry in the execution address memory 71 for each operand specifier in each instruction that the central processor unit 10 can process. Thus, the operation code from the byte 0 latch 70 produces a base address and the execution point counter 73 produces signals that are combined with the base address to identify, in sequence, the table entries corresponding to each operand specifier in an instruction that is being processed.

Output signals from the execution address memory 71 and the operand specifier in byte 1 position of the instruction buffer are transferred to the specifier decode logic 72 that identifies a starting sequence address for any given operand specifier in response to those signals. The starting address for any given microinstruction in the sequence comprises high-order bits that depend upon the instruction itself and low-order bits that depend upon the nature of the information in the operand specifier. Typical low-order starting address bits from the specifier decode logic 72 are shown in FIG. 6C. More specifically, if the register mode field of the operand specifier contains a "4" and the register field does not designate the program counter, the low-order starting address bits are "1C" (in hexadecimal notation). This then controls the location at which the microsequencer 44 begins to execute a sequence beginning with microinstruction located in the program control store 40 (FIG. 3) at the location identified by the starting address.

Before this information is decoded, however, the microsequencer 44 continues to perform other operations. In step A3 the microsequencer 44 uses the register field positions in the byte 1 position of the instruction buffer 60 to transfer to an A latch 75 the contents of a register in the register memory 76 that corresponds to the contents of the register field. If the register mode field in the operand specifier defines any of modes 0 through 3, the operand specifier contains the operand and the operand specifier is decoded. The microsequencer 44 then either begins to process the next operand specifier in the instruction or executes the instruction depending upon the operation code and the state of the execution point counter.

Figure 5A:
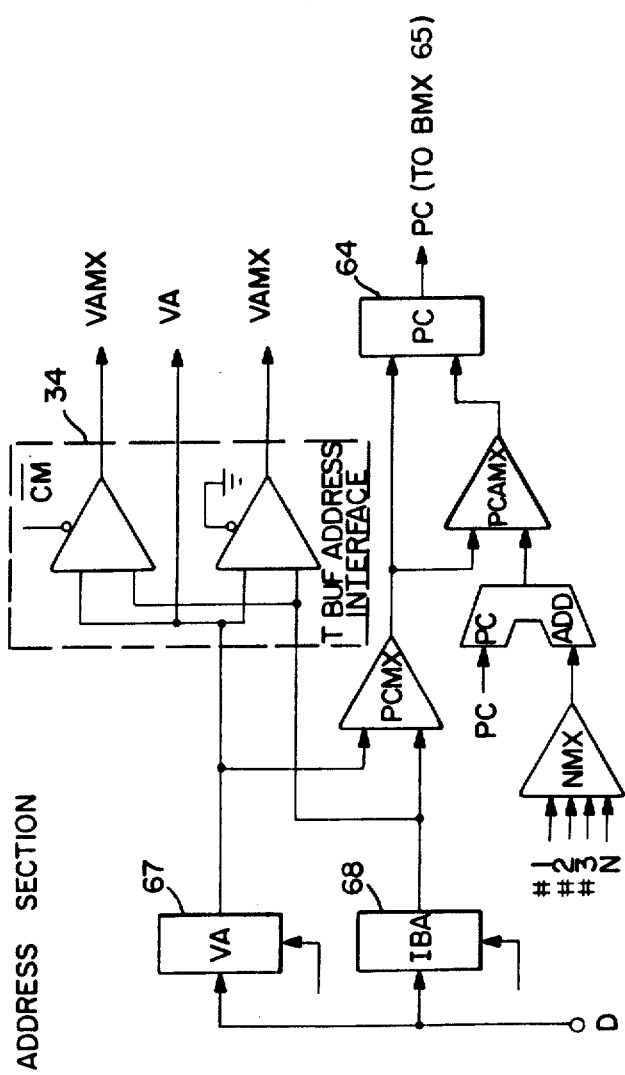

Assuming that the operand specifier does not include a literal, the microsequencer shifts from step A3 to step A4. In this step the contents of the register in the register memory 80 identified by the register field of the information in the byte 1 location of the instuction buffer 60 are transferred to a B latch 81. In this specific embodiment, the A and B register memories 76 and 80 are maintained as copies of one another and constitute all the general purpose registers that can be addressed by the contents of the register field of any operand specifier. For any mode other than a literal mode, the B latch 81 usually contains an address. Therefore, in step A5, the microsequencer 44 establishes a data path through the B multiplexer 65 (FIG. 5B) and the ALU 66 and transfers the address to the virtual address latch 67 (FIG. 5A). In addition, this address passes, without alteration, through a shifting circuit 82 (FIG. 5B), a DF multiplexer 83 (FIG. 5C) and a demultiplexer 84 to a D register 85. Those bits that would correspond to the exponent part of a floating point number are simultaneously transferred from the ALU 66 into an exponent section 86 (FIG. 5) of the data paths 36.

In step A6 the system transfers the contents of the program counter 64 to a program count save register 90 (FIG. 5B) thereby to enable certain instructions that require long processing intervals to be suspended in the event an interruption occurs. Circuitry for detecting interruption conditions and controlling tracing operations then is enabled. The microsequencer 44 in FIG. 3 transfers the contents of the byte 2 through 5 positions in the instruction buffer 60 over the ID bus 43 and through a Q multiplexer 91 (FIG. 5C) to a Q register 92. These byte locations contain information that represents potential displacement values if the operand specifier defines one of the displacement modes.

In step A8 the instruction buffer control 61 is enabled to request transfers of information in order to continuously fill the instruction buffer 60 with valid information. If a number of bytes in the instruction buffer can be cleared, this clearing operation is performed in step A9 and, in step A10, the program counter 64 is incremented to compensate for the number of bytes that have been cleared. This clearing operation and program counter update are performed if relevant data is already in the Q register 92. In step A11 the central processor 10 determines whether the operand specifier contains a literal. If it does, the microsequencer 44 branches to step A12 to place the literal in the Q register 92. Then the next operand specifier is decoded or, if all the operand specifiers have been decoded, the central processor unit 10 processes the operand or operands in response to the operation code. If the operand specifier does not contain a literal, the microsequencer 44 branches to step A13 to complete the operand specifier decoding operation.

At this point in the sequence, the A latch 75 (FIG. 5B) contains information corresponding to the register bit positions from the byte 2 location in the instruction buffer 60 (FIG. 6A). The B latch 81 (FIG. 5B), virtual address latch 67 (FIG. 5A) and D register 85 (FIG. 5C) contain the contents of the register that was selected by the register field bits in the byte 1 position of the instruction buffer 60. The Q register 92 contains any instruction stream data that may exist while the program counter 64 contains the address of the next operand specifier. Further operations depend upon the specific instruction being decoded and the nature of the operand specifier. There are numerous ways in which the central processor can complete the operand specifier decoding operation. An exhaustive description of each possibility would require an extraordinary amount of description. However, the operation of a central processor unit 10 in accordance with this invention can be clearly understood by examining the operation of the central processor unit 10 in response to some typical instructions.

(2) Decoding Operand Specifiers in an Adding Instruction a. Literal and Displacement Addressing Modes FIG. 8A depicts an instruction for adding information in two locations and depositing the sum in a third location without affecting either the first or second storage locations as it would appear in the instruction buffer 60 after the instruction has been retrieved in step A2 in FIG. 7. FIG. 8B depicts the information stored at the table entries in the execution address memory 71 (FIG. 6A) for the operation code associated with this instruction which is "C1". The meaning of the particular bit positions that constitute the operand specifier information are shown in FIG. 6B.

The first operand specifier is "07". With the execution point counter 73 at "00", the corresponding table entry in the execution address memory 71 contains the following information: (1) a specifier has been selected (bits 4 and 5); (2) the operand is an integer number (bits 0 and 1); (3) the operand contains four bytes (bits 2 and 3); and (4) the operand is being read from the memory (bits 6 and 7). Furthermore, the information that is transferred from byte 1 position in the instruction buffer 60 into the specifier decode logic 72 causes the specifier decode logic 72 to produce "00" as the low-order bits in the starting address for the microsequencer 44. (See FIG. 6C.) Following the sequence in FIG. 7, the microsequencer 44, in step B1 in FIG. 8C, establishes the necessary data paths to transfer this literal, namely "7" from the Q register 92 to the D register 85 through a shift register 93 that acts as a data aligner and the D multiplexer 84. At this point, the instruction buffer control 61 shifts bytes 2 to 7 one byte position to the right and advances the execution point counter 73 to "01" (step B2). From the table in FIG. 8B it will be seen that this indicates that the information now in byte 1 is an operand specifier for a longword integer number that is to be transferred into the central processor unit 10 during a reading operation.

Figure 7:
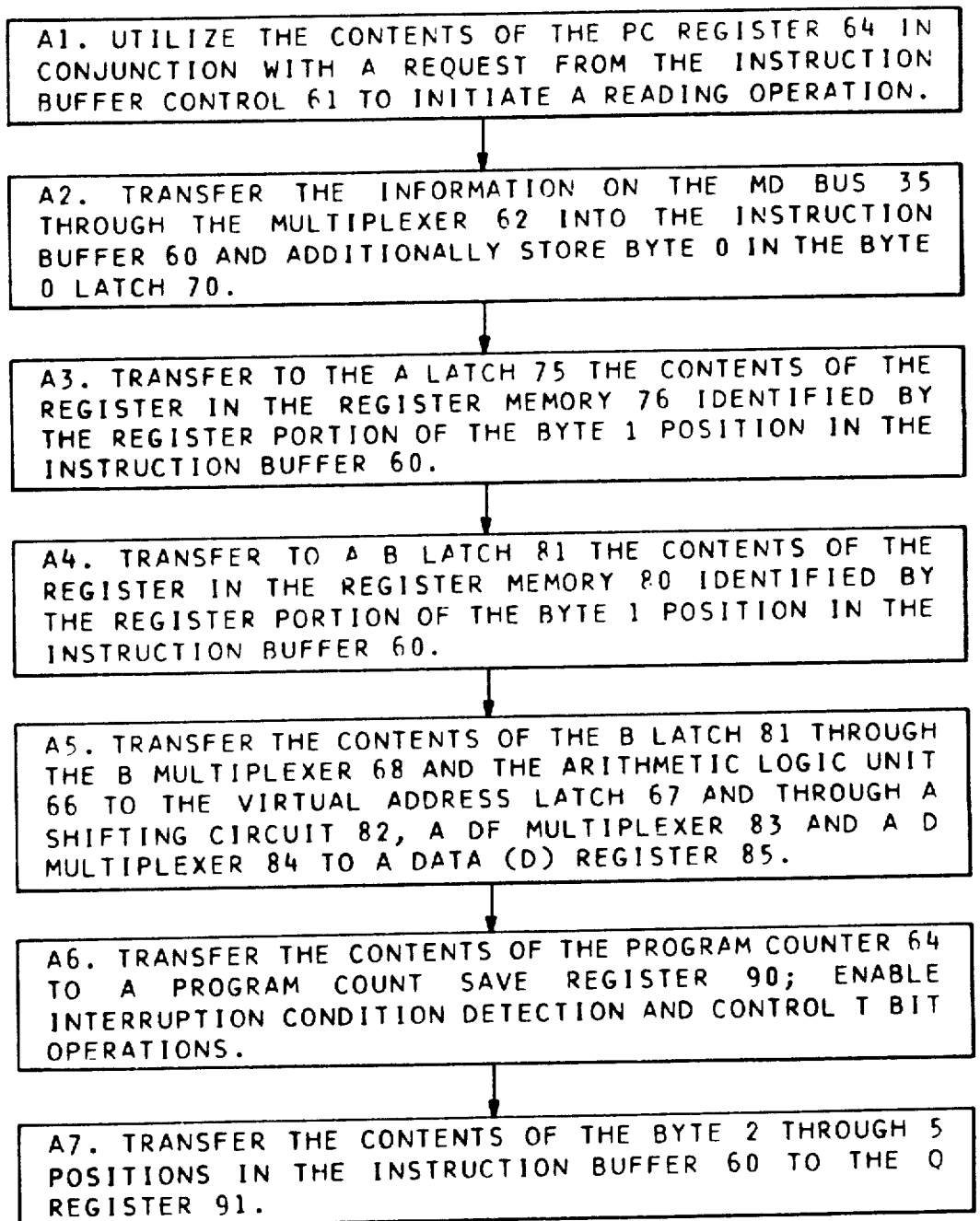
FIGS. 7 and 7A constitute a flow diagram that is useful in understanding the operation of the central processor unit shown in FIGS. 1 and 3.
Figure 7A:
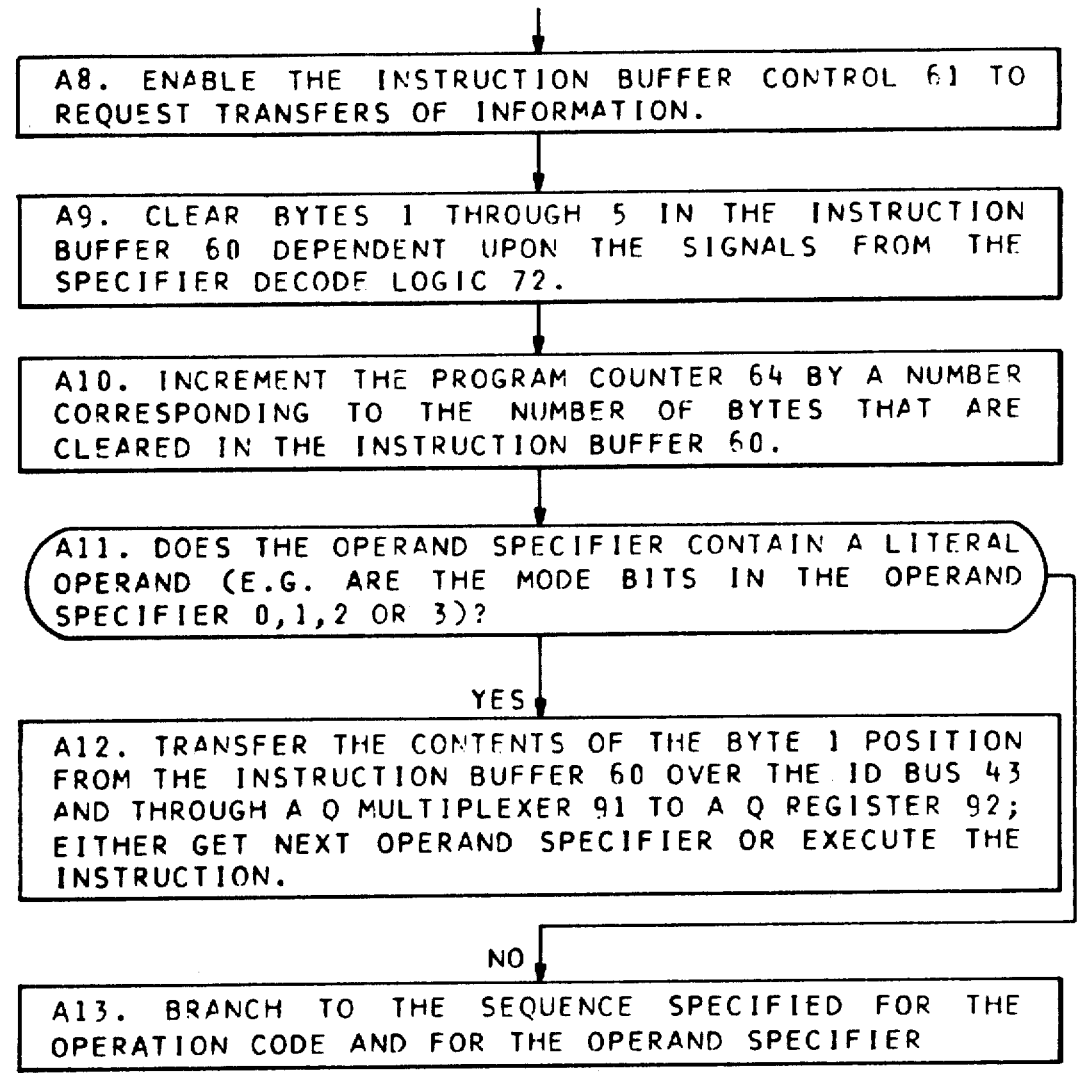

Now the system immediately transfers back to the steps in FIG. 7. At step A11 the second operand specifier is evaluated. In combination with the information now provided by the various tables in FIGS. 4, 6B, 6C and 8B, the microsequencer responds to establish the sequence of data paths that are necessary to decode an operand specifier that uses a byte displacement mode of addressing. During this decoding sequence the A latch 75 (FIG. 5B) and B latch 81 both receive the contents of the designated general register ("R1") (step B3). The Q register 92 (FIG. 5C) receives the byte displacement value "20" (byte 3) in step B4. In step B5 the ALU 66 (FIG. 5B) produces the sum of the contents of the B latch 81 which contains the contents of the designated register and the contents of the Q register 92 which contains the displacement value. More specifically, the contents of the Q register 92 pass through the RA multiplexer 94 (FIG. 5C) and an A multiplexer 95 (FIG. 5B) into the A input of ALU 66 while the contents of the B latch 81 pass through the B multiplexer 65 into the B input of the ALU 66. The sum of those two inputs represent the displaced address which is then transferred to the virtual address latch 67 (FIG. 5A) and also back through the shifting network 82 (FIG. 5B), DF multiplexer 83 (FIG. 5C) and Q multiplexer 91 to the Q register 92. Now, in step B6, the microsequencer 44 enables the instruction buffer control 61 to clear out the contents of the second operand specifier and to initiate a request to obtain the second operand in step B7. In step B8 the microsequencer 44 transfers the second operand from the MD bus 35 through a data aligner 96 (FIG. 5C) and the D multiplexer 84 to the D register 85 and the first operand is transferred to the Q register 92.

Now the microsequencer 44 advances the execution point counter 73 (step B9) to the third table entry in FIG. 8B that specifies an execution. Therefore, the microsequencer 44 controls the ALU 66 so that it generates the arithmetic sum of the two addends and transfers the sum into the D register 85 (FIG. 5C) during step B10.

In step B11 the microsequencer 44 advances the execution counter 73 to "11", the final state shown in FIG. 8B. The information in the table indicates that the operand specifier designates an address in memory to which a four-byte integer number is to be written. The value C2 is resident in the byte 1 position of the instruction buffer 60, and the "C" in the register mode field defines a word displacement address. Therefore, the microsequencer 44 uses steps B12 through B16 to calculate the memory address and to initiate a transfer of the sum to that memory location. When these steps have been completed, the microsequencer 44 clears the execution point counter 73 in step B17 and reverts to the steps in FIG. 7 thereby to initiate the transfer and decoding of the next instruction in sequence.

b. Indexed Addressing Mode

Figures 1, 9C:
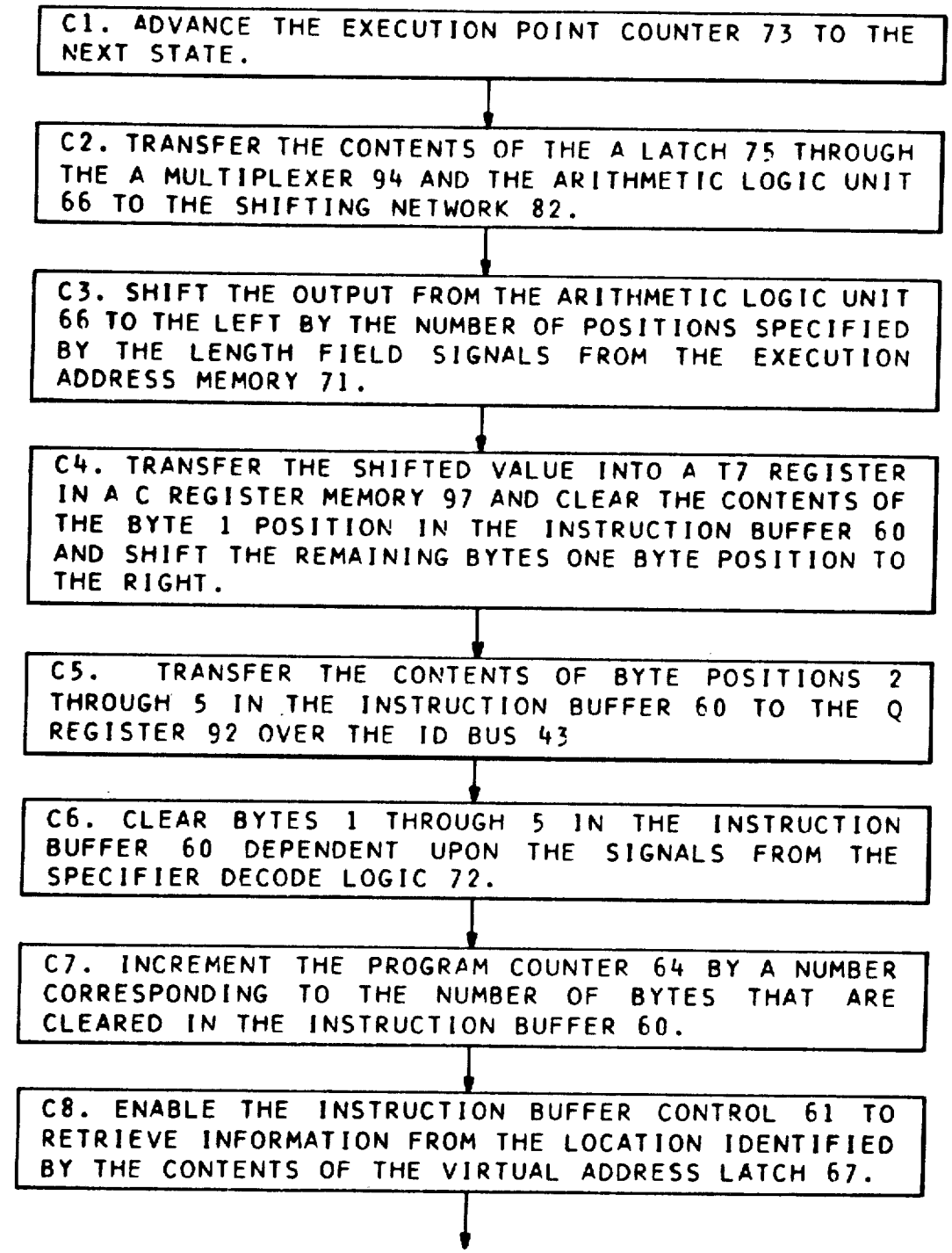
FIG. 9C, comprising
Figures 2, 9C:
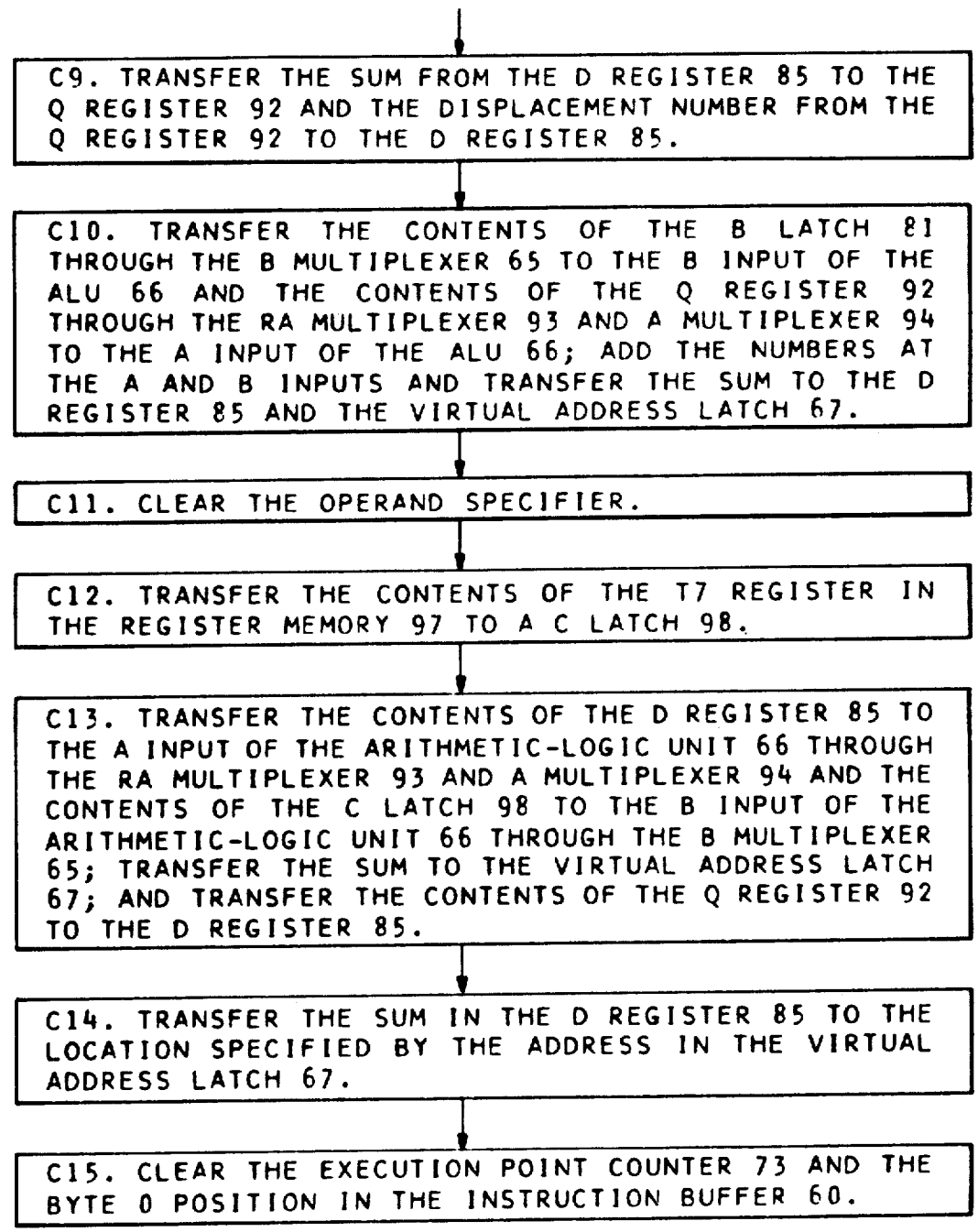

The third operand specifier shown in FIG. 8A defines a word displacement mode. If the adding instruction were to be used iteratively and it were desired to store successive sums in an array of locations, a programmer might elect to utilize the word displacement mode and further index the locations. Such an indexed displaced address can be produced with this central processor unit. The programmer would alter the third operand specifier in FIG. 8A to correspond to the instruction in FIG. 9A. That instruction identifies the "R7" register as an index register.

More specifically, the original byte 4 position in the instruction buffer 60 (FIG. 6A) contains "47" when the instruction decoding operation begins. Step C1 in FIG. 9C corresponds to step B11 in FIG. 8C. In step C1, the execution point counter 73 in FIG. 6A is advanced thereby to indicate a writing operation with a longword integer number. At this time, the A latch 75 and B latch 81 (FIG. 5B) both contain the contents of the "R7" general purpose register; the Q register 92 (FIG. 5C) and the virtual address latch 67 (FIG. 5A) contain the second operand address and the D register 85 (FIG. 5B) contains the sum of the addition operation. At the time of step C1, the third operand specifier occupies the byte 2 through byte 5 positions in the instruction buffer 60. Thus, the A latch 75 will contain the contents of the "R7" general purpose register which is the designated index register. In step C2 the contents of the A latch 75 are transferred through the A multiplexer 95 and ALU 66 to the shifting circuit 82.

The shifting circuit 82 shifts the index value to the left by a number of byte positions that corresponds to the LENGTH signals from the execution address memory 71 during step C3. In this case, a longword is involved, so the LENGTH field contains "10" and the index is shifted two byte positions thereby effectively to multiply the index value by 4 and compensate for the size of the longword data item that is to be transferred. If a byte is being transferred, no shift will occur so the index is effectively multiplied by 1 whereas if a quadword is being transferred, the index register contents are shifted to the left by three byte positions, thereby to effectively multiply the index by 8 and compensate for the eight-byte quadword size. Thus, this operation scales the index value to the size of the data item being transferred.

After scaling, the index value is stored in a C register memory 97 (FIG. 5B) at a predetermined location that is specified as a T7 register during step C4. Also the contents of the byte 1 position in the instruction buffer 60 are cleared so the value "C" shifts into the byte 1 position. At step C5 the contents of byte positions 2 through 5, which includes a displacement value "0140" are transferred to the Q register 92 (FIG. 5C) over the ID bus 43. Then, depending upon the operation code and the operand specifier being processed, the specifier decode logic 72 controls the clearing of byte positions 1 through 5 in the instruction buffer 60 in step C6 and increments the program counter 64 by a corresponding number in step C7. During step C8 the instruction buffer control 61 is enabled to retrive information from any location identified by the contents of the virtual address latch 67. In step C9 the arithmetic sum in the D register 85 is moved to the Q register 92 and the displacement number "0140" is moved from the Q register 92 to the D register 85. The B latch 81 contains the contents of the "R2" register and this value is moved through the B multiplexer 65 to the input of the ALU 66 in step C10. The displacement value from the Q register 92 is moved to the A input of ALU 66. The sum constitutes the displaced address, and it is transferred back to the D register 85 and to the virtual address latch 67, although it is not used. In step C11 the remaining byte portions of the third operand specifier are cleared.

Figure 5B:
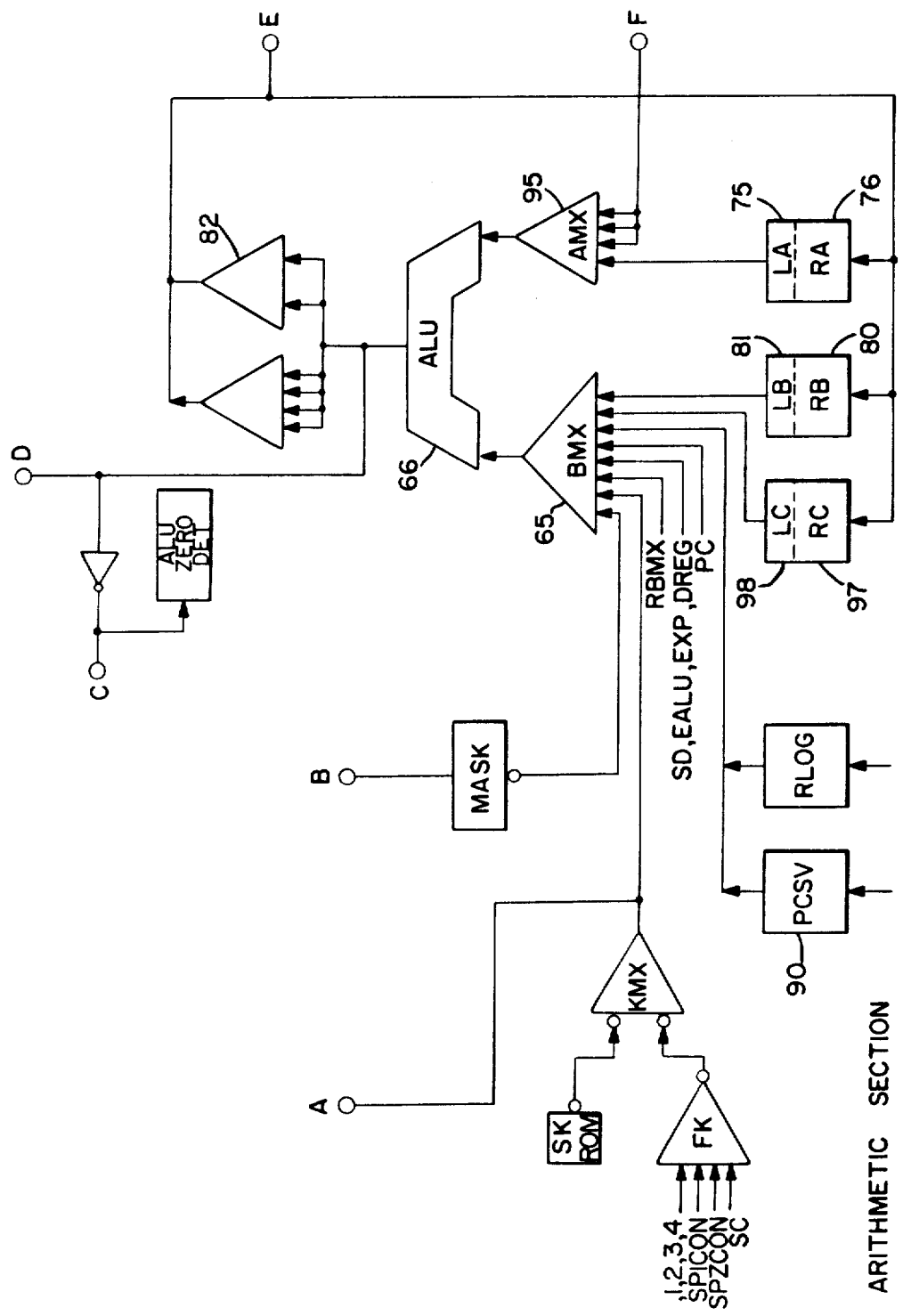

The indexing operation then occurs. In step C12 the contents of the T7 register in the register memory 97 are transferred to a C latch 98 (FIG. 5B). This is the scaled index, and during step C13 it is transferred through the B multiplexer 65 to the B input of the ALU 66. At the same time, the displaced address is transferred from the D register 85 (FIG. 5C) through the RA multiplexer 94 and the A multiplexer 95 (FIG. 5B) to the A input of the ALU 66. The indexed address is then produced by adding the numbers at the two inputs and transferring the sum, which is the indexed address, to D register 85. In step C14 this address is moved to the virtual address latch 67.

The operand now is in the Q register 92. The microsequencer 44 moves this sum from the Q register 92 back to the D register 85. Then, in step C14, the microsequencer 44 moves the operand through the data aligner 96 onto the MD bus 35 for transfer to the memory unit 11 and the data cache 33 at the location addressed by the contents of the virtual address latch 67. As a final step, the execution point counter 73 and the byte 0 position in the instruction buffer 60 are cleared. This enables buffer control circuit 61 to shift the next valid data in the instruction buffer 60 into the 0 and successive byte positions.

From the foregoing discussion, it will be apparent that the index mode is not a separate and exclusive mode. It is an extension to any of the available addressing modes that reference memory (i.e., modes 6 through 15). These modes are marked with asterisks in FIG. 4. The indexing mode is implemented with a single byte which specifies the index register and this can be combined with any further extension of the operand specifier which can comprise from one to nine additional bytes. In this connection the indexing mode can be considered to provide a base register which contains a physical offset plus the index register which contains the logical offset in an array. The scaling provided by the shifting operation automatically compensates for the data word size so the index register itself does represent a logical offset of one data item notwithstanding the size of that data item. It will also be apparent that the variable length nature of the operands specifiers further enhance the indexing mode because an instruction only includes the space for indexing information when an indexed address is to be produced.

iii. Subroutine Calling Instructions

FIGS. 10A and 10B depict two different subroutine calling instructions. The calling instruction in FIG. 10A is a "CALLG" instruction and comprises an one-byte operation code "FA" followed in this specific figure by a one-byte operand specifier to define an argument list and a one-byte operand specifier to define a destination, namely the first location in the subroutine being called. FIG. 10B shows a "CALLS" calling instruction with an operation code "FB" that is followed by a one-byte operand specifier that defines an argument count and a one-byte operand specifier that defines the first subroutine address. The CALLG instruction shown in 10A calls a subroutine when the argument list is stored at various locations in the memory whereas the CALLS instruction in FIG. 10B calls a subroutine when the calling subroutine has already transferred the argument list to be used into a memory stack identified by an "R14" general purpose register that operates as a stack pointer register. The argument list contains input addresses and values to be used by the subroutine and output addresses for the output values produced by the subroutine.

Figures 1, 10C:
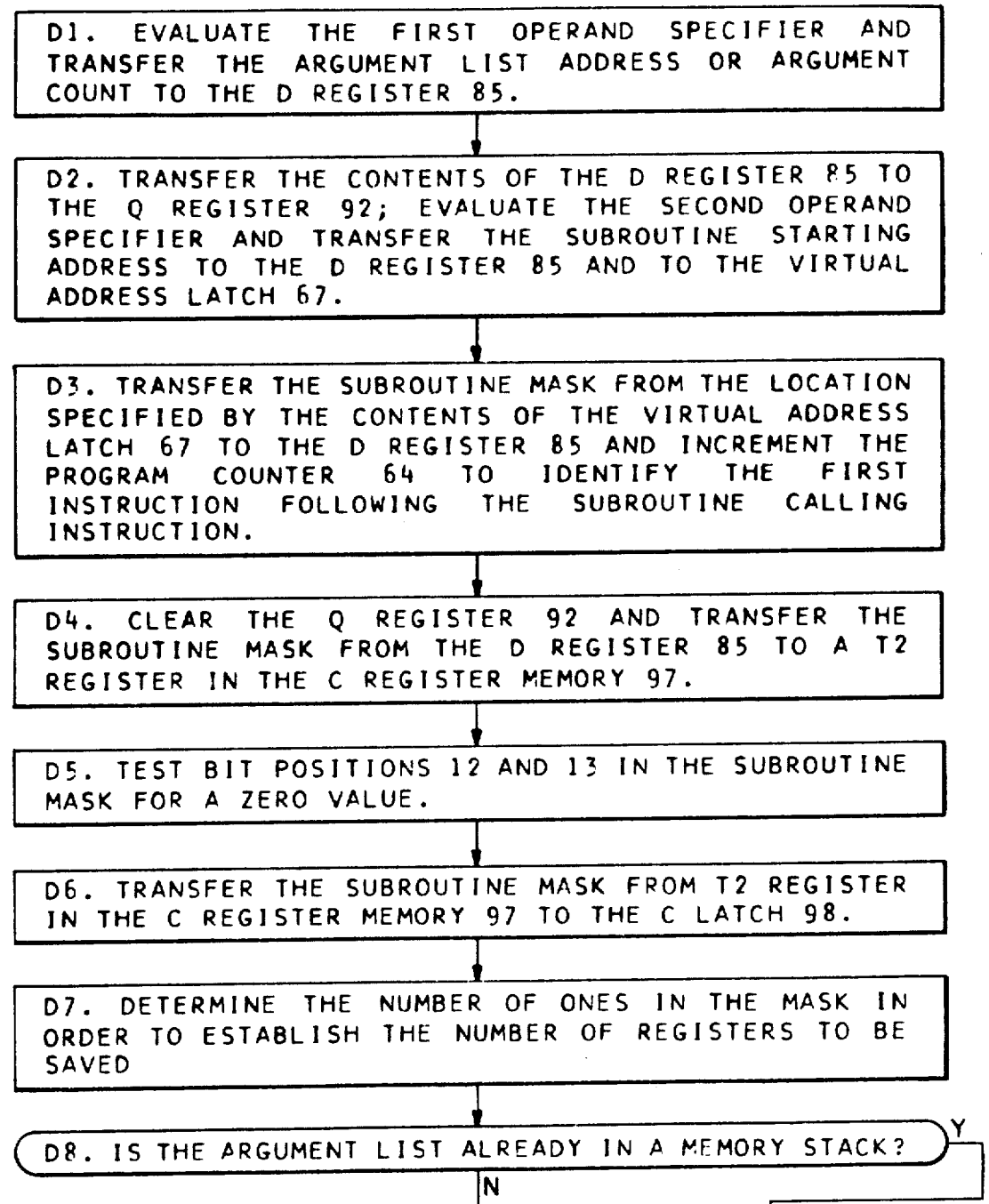
Figures 2A, 10C:
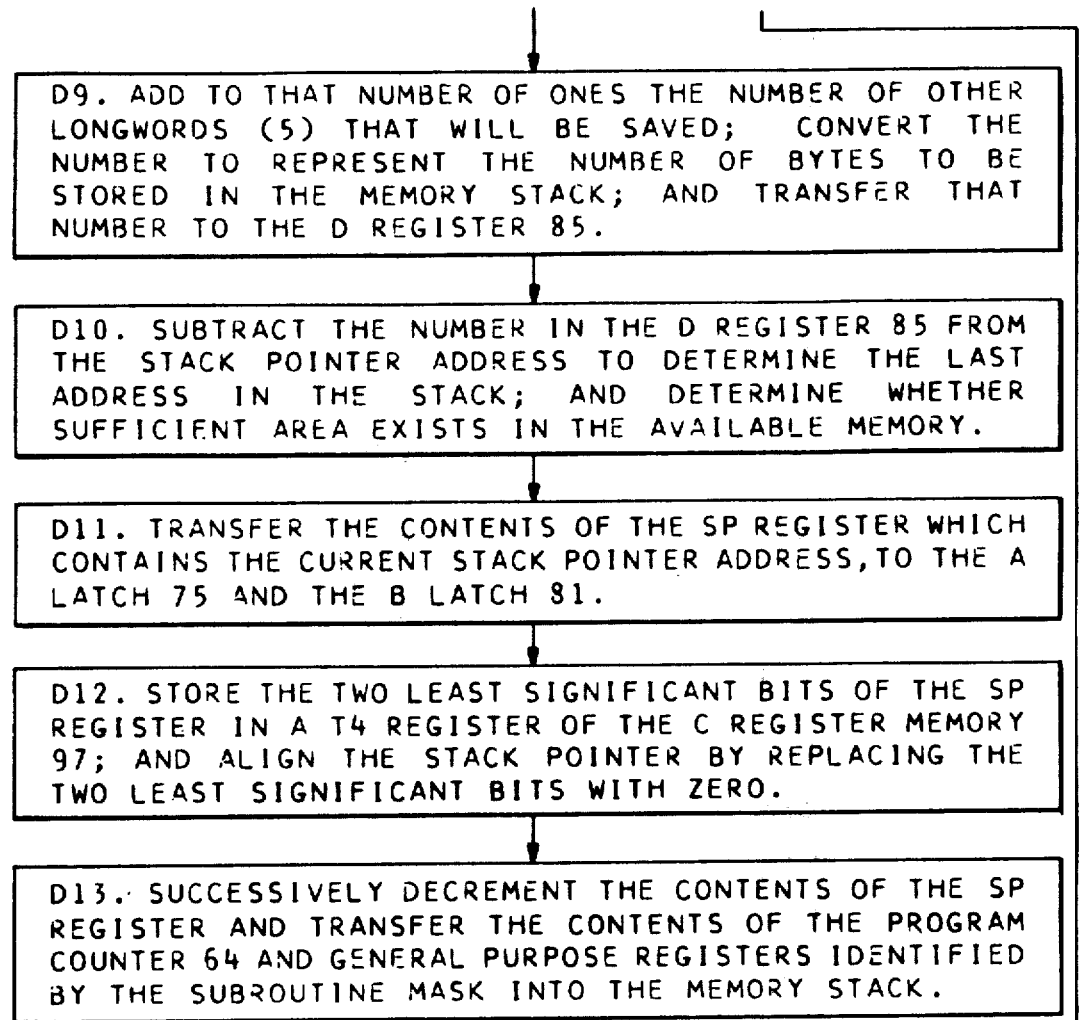
Figures 2B, 3, 10C:
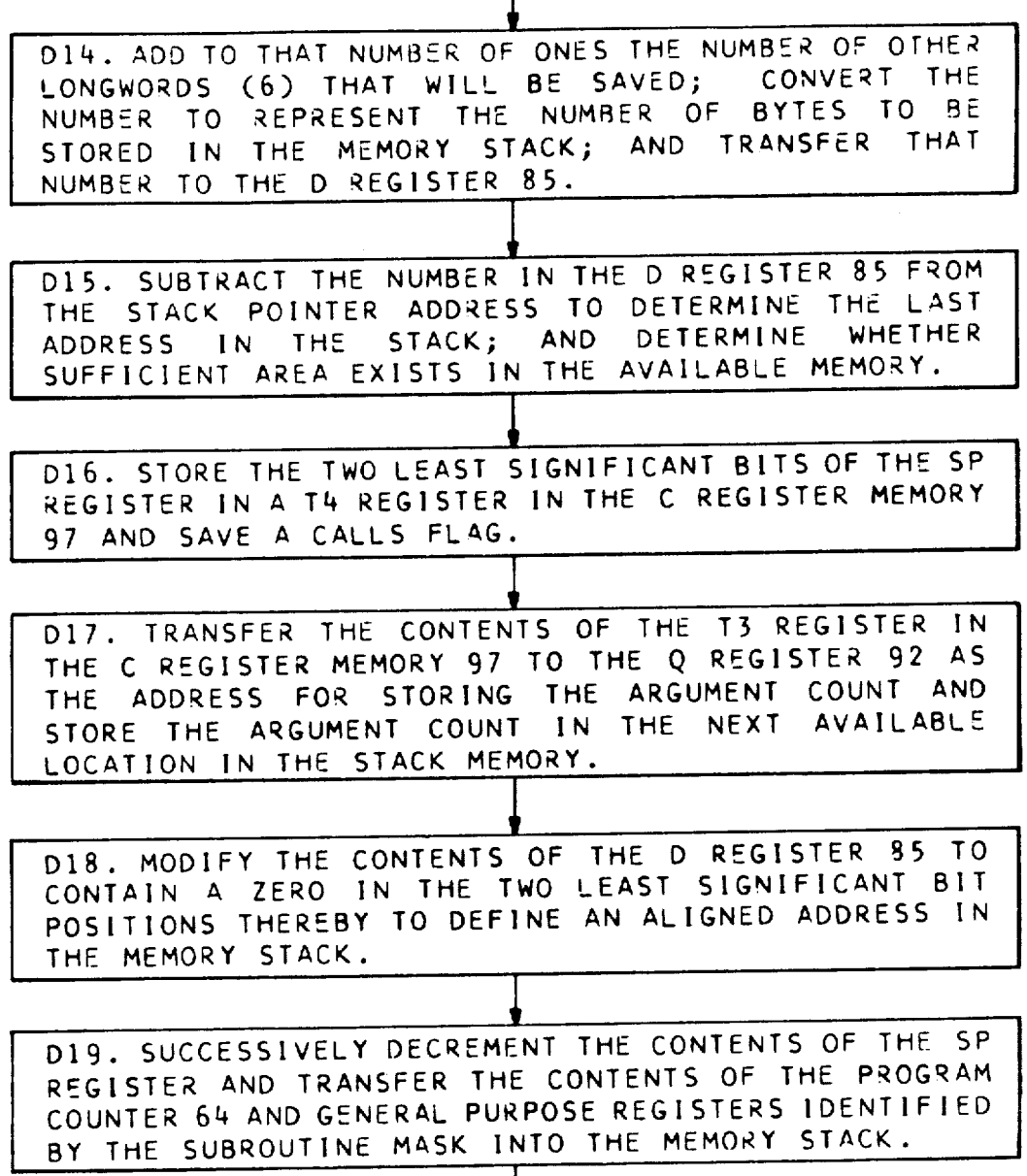
Figures 3, 10C:
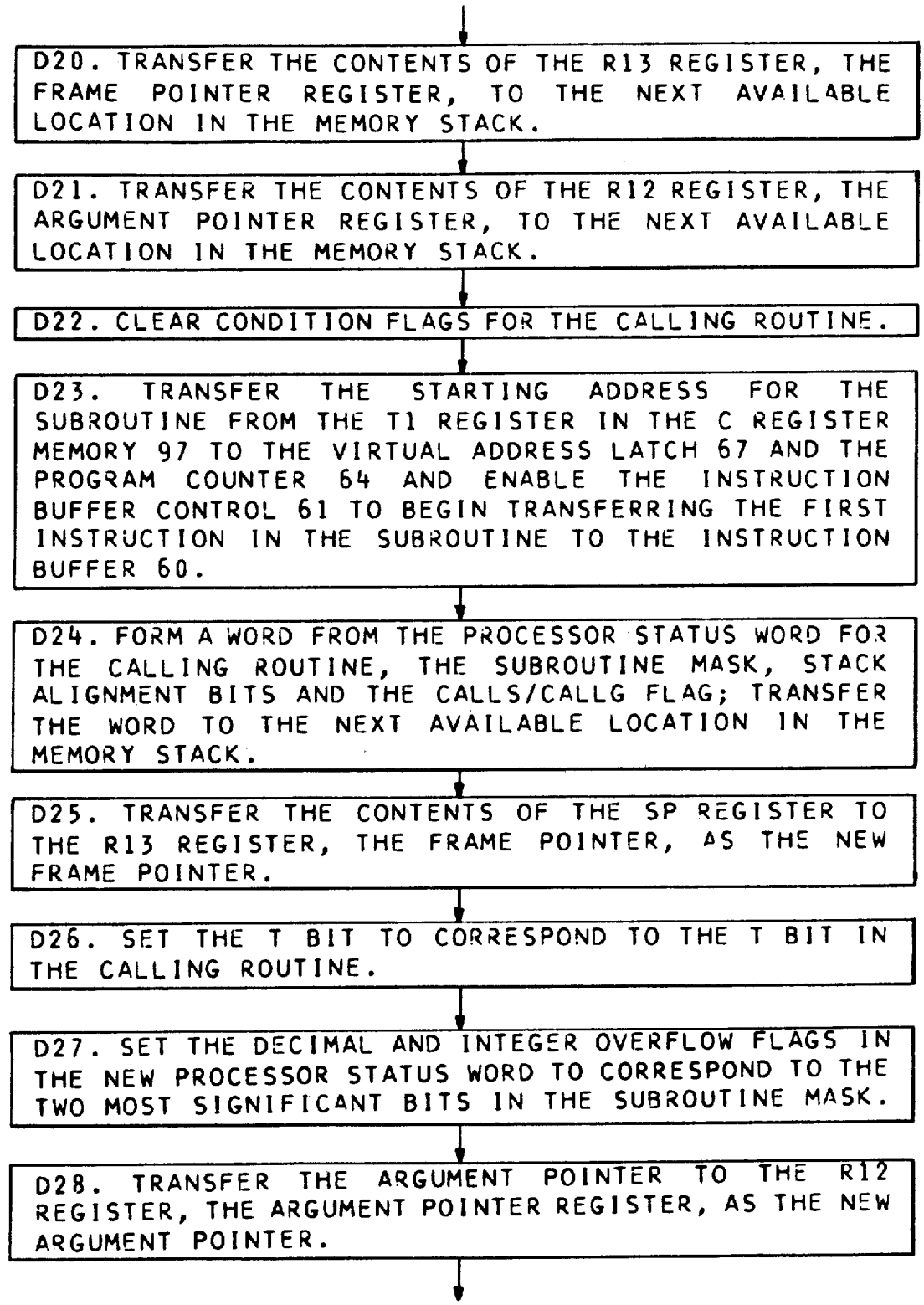

Referring now to FIG. 10C-1, in Step D1, the central processor unit 10 evaluates the first operand specifier and transfers the argument list address in the case of the instruction shown in FIG. 10A or the argument count in the case of the instruction shown in FIG. 10B to the D register 85 (FIG. 5C). In step D2 the contents of the D register 85 are transferred to the Q register 92 and the destination field in the destination operand specifier is evaluated. The resulting initial address for the subroutine is moved to the D register 85 and to the virtual address latch 67 (FIG. 5A).

In accordance with one aspect of this calling instruction, the first location of the subroutine contains a subroutine mask that is interpreted as follows. Bit positions 0 through 11 correspond directly to general registers R0 through R11. Each bit position in the subroutine mask has been set or cleared depending upon whether the contents of the corresponding general purpose register are to be saved or not. As apparent, the contents of a general purpose register will be saved if the subroutine will alter the contents of that general purpose register. The remaining general purpose registers R12 through R15 either are always saved or never saved. More specifically, the R12 register constitutes an argument pointer register and it is always saved. Likewise, the R13 register constitutes a frame pointer register, and the R15 register constitutes a program counter register; they also are always saved. On the other hand, the R14 register constitutes the stack pointer register and is never saved. Thus, the four most significant bit positions in the subroutine mask can be used for other purposes.

In this particular embodiment, bit positions 12 and 13 of the subroutine mask location are always 0, although they could be used for other purposes. Bits 14 and 15, on the other hand, establish the initial conditions of the integer overflow and decimal overflow error condition flags upon entry to the subroutine itself. Thus, the information in the first location of the subroutine constitutes operating information that defines the operating characteristics for the central processor while it is processing the subroutine.

Still referring to FIG. 10C-1 and Step D3, the program counter 64 (FIG. 5A) previously has been incremented thereby to identify the first instruction following the subroutine calling instruction in the calling routine. Next, the Q register 92 is cleared and the subroutine mask is moved from the D register 85 to a T2 register in the C register memory 97 (FIG. 5B). Bit positions 12 and 13 in the subroutine mask are tested to determine if they have a 0 value. If they do not, an error condition exists and appropriate trapping conditions occur. Normally, step D5 transfers to step D6 whereupon the subroutine mask is transferred to the C latch 98. In step D7 the number of ones in the subroutine mask are counted in order to establish the number of general registers which need to be stored to preserve the state of the calling routine. Step D8 represents a branch which either transfers operation to the step shown in FIG. 10C-2A for the call instruction shown in FIG. 10A or FIG. 10C-2B for the call instruction shown in FIG. 10B.

Assuming that the CALLG instruction shown in FIG. 10A is being decoded, it is necessary next to establish the total space in the memory stack that will be occupied by the state of the calling routine. For this instruction, five additional longwords will be saved, these correspond to the locations for the subroutine mask and processor status and the argument and frame pointers, the program counter and a condition handler that is described later. Thus, in step D9 that number is added to the number of ones in the mask and the sum is converted into a number of bytes and then used to determine, with the contents of the stack pointer register, the last location in the stack (step D10). As previously indicated, the central processor unit 10 operates as a virtually addressed machine. Therefore, steps must be taken to assure that there is sufficient space in the memory stack allocated to the particular program being implemented to accommodate all the registers that will be saved. During step D11 the contents of the R14 register, the stack pointer register, are transferred to the A and B latches 75 and 81 (FIG. 5B) and the least two significant bits of the R14 register are transferred to a T4 register in the C register memory 97 in step D12.

In step D12 the stack pointer register also is aligned by replacing the two least significant bits in the R14 register with zeroes thereby forcing the address in that register to define a longword boundary. As transfers into and from the memory units 11 and the data cache 33 are made on longword boundaries, this alignment procedure assures that each register can be saved with a single memory transfer and improves the overall efficiency of the instruction. Otherwise, there would be a possibility of having to perform two transfers to save each register thereby greatly increasing the amount of time required to execute the calling instruction and subsequent instructions in the subroutine that normally are aligned.

After alignment, the aligned contents of the stack pointer register are decremented to identify successively a sequence of vacant longword locations in the memory. This enables the microsequencer 44, in step D13, to transfer the contents of the program counter 64 and those general purpose registers that are specified in the subroutine mask into the memory stack. This step saves the location of the calling routine at which the instruction following the calling instruction will be found and those general purpose registers that will be used by the subroutine. After completing step D13, the state of the calling routine has been saved, so the central processor transfers to the steps shown in FIG. 10C-3.

FIG. 10C-2B sets forth the steps taken if the CALLS instruction shown in FIG. 10B is being decoded. In steps D14 and D15, the central processor unit 10 again determines whether there is sufficient space in the memory stack allocated to it for storing the information. The two least significant bits of the stack pointer register are moved to a T4 register in the C register memory 97 in step D16. In step D17, the argument count from the T3 register in the C register memory 97 moves to the Q register 92. In addition a CALLG/CALLS flag is set. This flag is saved subsequently in the memory stack and is used later by the return instruction to control the retrieval of information from the memory stack. Thus, the CALLG and CALLS instruction can be used to call a subroutine interchangably. The stack pointer register is decremented to identify the next available location and the decremented contents are stored in the D register 85. Then the argument count in the Q register 92 is stored in the memory stack thereby to complete the argument list. During step D18 the contents of the D register 85 are modified so the R14, or stack pointer, register is aligned on a longword boundary for the next available location. In step D19, the microsequencer 44 saves the calling routine state by saving the program counter 64 and general purpose registers that will be used by the subroutine in the memory stack as it does in step D13 in FIG. 10C-2A beginning at the aligned location in the memory stack.

Now referring to FIG. 10C-3, the microsequencer 44 transfers to step D20 after completing the transfers represented by step D13 in FIG. 10C-2A or step D19 in FIG. 10C-2B. More specifically, the contents of the R13 register that acts as the frame pointer register are then transferred to the next available location in the memory stack. This is followed by the contents of the R12 register that constitutes the argument pointer register. In step D22, the condition flags for the calling routine are cleared. Next the central processor unit 10 transfers the starting address for the subroutine from the T1 register in the C register memory 97 to the virtual address latch 67 and the program counter 64 (step D23). Then the instruction buffer control 61 begins transferring the first instruction in the subroutine to the instruction buffer 60. The microsequencer 44, in step D24, forms a word from the old processor status word, the subroutine mask, the stack alignment bits and the CALLS/CALLG flag and saves this word in the memory stack. This completes the processing of saving the operating information associated with the calling routine.

In step D25 the microsequencer 44 transfers the contents of the stack pointer register to the R13 register as the new register frame pointer. Next a T bit is set to correspond to the T bit in the calling routine in step D26; the T bit is used for tracing operations. In step D27, the microsequencer 44 sets the decimal and integer overflow flags in accordance with the two most significant bits in the subroutine mask; other flags, such as a floating underflow flag, can also be controlled.

In step D28, the information is transferred into the R12 register as the new argument pointer register. If the instruction is the CALLG instruction shown in FIG. 10A, this information contains the address of the first location in the argument list which, in turn, contains the argument count. If the instruction is the CALLS instruction shown in FIG. 10B, this information contains value of the stack pointer after the argument count operand is moved to the memory stack. In either case, the next operation is to store, in step D29, a zero value for a condition handler address in the next available location of the memory stack. This reserves a location in the memory stack for any subsequent condition handler address and also indicates that initially no condition handler exists.

A condition handler is a secondary subroutine which can be called if some unusual condition occurs during the execution of the primary subroutine. Specifically, a condition handler subroutine is used to return the data processing system to a known state in the event of some error. For example, if a subroutine were to attempt to access a non-existent file, a condition handler subroutine could be called. In such a application, the subroutine would store the initial address for the condition handler subroutine in the reserved location in the memory stack.

After step D29, the operating information for the subroutine has been retrieved from the subroutine, so the operating environment for the subroutine has been established. Thus, the central processor can begin to process the first instruction in the subroutine which the instruction buffer control 61 began to retrieve in step D23. The two subroutine calling instructions are very powerful. When either calling instruction has been completed, all information that is necessary for a transfer to and from a subroutine has been properly saved. More specifically, the memory stack contains the calling routine program counter and other information that preserves the state, or environment of the calling routine. The arguments are easily retrieved by using the argument pointer in the R12 register and the various condition flags are set, so the environment for the subroutine also is established.

The last instruction in the subroutine is a return instruction which comprises a single operation code; it has no operand specifiers. This instruction effectively reestablishes the operating environment for the calling routine and returns control to the calling routine. In response to this instruction, the contents of the current frame pointer in the R13 register are modified and transferred back to the R14 register to indicate the bottom of the memory stack that was established by the previous call instruction and enables the microsequencer 44 to pass immediately to the beginning of the relevant portions of the stack.

The contents of the next location in the memory stack includes (1) the processor status for the calling routine, (2) the subroutine mask, (3) the indication of whether subroutine was called by the instruction in FIG. 10A or 10B, and (4) the two-bit value stored during stack alignment. The subroutine mask is tested to determine whether bits positions 0 through 11 are zero. If they are, no registers need to be restored so it is possible to isolate the saved subroutine mask and test the two high-order bits in the saved subroutine mask thereby to reestablish the decimal and integer overflow flags. If the bits 0 through 11 of the mask contain any ones, the corresponding registers must then retrieved. Next, the stack pointer is properly aligned in response to the saved stack alignment bits. The central processor unit tests the bit which identifies the calling instruction. If the instruction in FIG. 10A has been called, the return is complete, so the microsequencer 44 begins to process the next instruction in the calling routine. Otherwise, it retrieves the argument count from the memory stack, increments that count by one, converts that count into the number of bytes, adds the byte number to the contents of the stack pointer register and stores that sum into the stack pointer register. Then the retrieved program counter is used to enable the instruction buffer control 61 to retrieve the next instruction from memory which is the instruction following the call instruction in the calling routine thereby to complete the return from the calling instruction shown in FIG. 10B. Thus, the return instruction returns the saved operating information for the calling routine from the memory to the central processor and returns operations to the central processor in the environment originally established by the calling routine.

iv. Multiple Byte Operation Codes

As previously indicated, the central processor of this invention also can be adapted for processing operation codes that comprise single or multiple bytes. It is assumed that all multiple byte operation codes are grouped into sets that are identified by unused operation codes. For example, an operation code FC in byte location 0 might be a prefix for a two-byte operation code class. FIG. 6A discloses a latch 100 that connects to the CS bus 41 and to the execution address memory 71. The microsequencer will, upon the decoding of a prefix code, establish a signal state on the CS bus 41 that sets the latch. The signal from the latch then will serve as an additional input address signal to the execution address memory 71 thereby generally to force an execution cycle that will have no effect other than to shift the operation code in the byte 1 location into the byte 0 location and force the microsequencer into a proper operation for decoding that operation code. Upon completion of processing, the microsequencer then would establish another set of signals that clear the latch 100.

In summary, there is described a data processing system that includes a processor that decodes various types of instructions including calling instructions that call subroutines and that return operations from the control of the subroutine to the control of the calling routine. In accordance with this invention, there are two calling instructions: one for calling a subroutine when the arguments for that subroutine are stored in a memory stack, and another for calling a subroutine when the arguments are not stored in the stack. In response to either calling instruction, the central processor automatically stores operating information concerning that operating environment of the calling routine in memory and utilizes corresponding information in the subroutine to establish the operating environment for the subroutine. The return instruction reestablishes the operating environment for the calling routine. In one embodiment, certain operating information is retrieved depending upon the nature of the calling instruction. The automatic operation in accordance with this invention tends to reduce program size and to simplify the programmer's job.

The foregoing description is limited to a specific embodiment of this invention. It will be apparent, however, that this invention can be practiced in data processing systems having diverse basic construction or in systems that use different internal circuitry than is described in this specification with the attainment of some or all of the foregoing objects and advantages of this invention. Therefore, it is the object of the appended claims to cover all such variations and modifications as come within the true spirit and scope of this invention.

What we claim as new and desire to secure by Letters Patent of the United States is:

1. A central processor for a data processing system which system further includes a memory for storing instructions that are grouped in routines, at least one routine constituting a subroutine for processing information in an argument list, a predetermined memory location of the subroutine storing operating information that defines the operating environment of the central processor while it is processing the subroutine, and at least one other routine in the memory being a calling routine that utilizes the subroutine and that contains a subroutine calling instruction that includes an operation code, a first operand specifier for identifying a representation of the argument list to be passed from the calling routine to the subroutine and a second operand specifier for identifying the predetermined location in the memory, said central processor comprising:
   A. a program counter register for addressing instructions in the memory,
   B. A stack pointer register for addressing locations in a memory stack including a block of consecutive memory locations,
   C. operating environment means for storing operating information that defines the operating environment for said central processor unit of the routine being processed by said central processor,
   D. instruction decoding means for decoding the instruction operation codes,
   E. operand retrieval means connected to said instruction decoding means for decoding the operand specifiers of the subroutine when said instruction decoding means decodes an operation code as a subroutine calling instruction, and
   F. control means connected to said operating environment means, said instruction decoding means and said operand retrieval means for controlling the response of said central processor to the subroutine calling instruction, said control means including:
      i. means connected to said instruction decoding means and said operating environment means for storing the operating information for the calling routine in the memory stack at locations specified by said stack pointer register prior to the execution of the subroutine thereby automatically to save processor state information for the calling routine, and
      ii. means for transferring the operating information from the subroutine to said operating environment means thereby to establish the operating environment for said central processor during the processing of the subroutine.

2. A central processor as recited in claim 1 wherein the last instruction in a subroutine is a subroutine return instruction and wherein said control means includes means responsive to said stack pointer register and the subroutine return instruction for transferring, from locations in the memory stack designated by said stack pointer register to said operating environment means, the operating information for the calling routine thereby automatically to reestablish the operating environment for said central processor that was defined by the calling routine.

3. A central processor as recited in claim 2 wherein said instruction decoding means includes means for distinguishing between a first type of subroutine calling instruction that is used when the arguments are disposed in the memory stack by other instructions in the calling routine and the first operand specifier designates the number of arguments in the argument list and a second type of subroutine calling instruction wherein the first operand specifier is decoded to obtain the address in the memory for a first argument in the argument list for the subroutine, said control means including means for storing in the memory stack as operating information, an instruction type value indicating whether the first or second type of subroutine calling instruction was decoded in said instruction decoder means, said control means being responsive to the return instruction for retrieving the instruction type value thereby to enable a single return instruction to reestablish the operating environment for the calling routine for either type of the calling instruction.

4. A central processor as recited in claim 1 wherein the memory comprises a plurality of contiguous memory blocks that each have a predetermined number of byte locations, wherein information is stored in the memory as information blocks and wherein a given information block resides in contiguous memory blocks, each memory address having a first portion for addressing a memory block and a second portion for identifying the starting byte location for the addressed information block, said control means in said central processor further including:
   i. means connected to said instruction decoding means and said general purpose register means for storing the second portion of the memory address from said stack pointer register as saved alignment operating information, and ii. means connected to said instruction decoding means for setting the contents of the second portion of the address in the stack pointer to a reference value, whereby the starting byte location addressed by said stack pointer register assures that each information block that is of the same or smaller size than the memory block will be transferred to a single memory block.

5. A central processor as recited in claim 4 wherein the last instruction in a subroutine is a subroutine return instruction and wherein said control means includes means responsive to the subroutine return instruction for restoring the first and second portions of the memory address to said stack pointer register in response to the saved alignment operating information.

6. A central processor as recited in claim 2 wherein the operating information includes trap enabling information that controls trapping operations of the central processor and wherein said control means includes means responsive to a calling instruction for storing the trap enabling information for the calling routine in the memory stack and for transferring the trap enabling information for the subroutine from a predetermined location in the subroutine to said control means thereby to establish the trapping conditions to be used by said central processor while executing the subroutine.

7. A central processor as recited in claim 6 wherein the last instruction in the subroutine is a subroutine return instruction and said control means includes means responsive to the subroutine instruction for transferring from said memory stack to said central processor the saved trap enabling information thereby to reestablish the trap information for the calling routine.

8. A central processor as recited in claim 1 wherein the predetermined location in the subroutine stores a subroutine mask, wherein said central processor additionally comprises a plurality of general registers, the subroutine mask in the subroutine designating those of said general registers to be used by the subroutine, and wherein said control means includes means connected to said general purpose register means for storing the contents of said program counter register and those general registers designated by the subroutine mask in the memory stack at locations specified by said stack pointer register prior to the execution of the subroutine as elements of the operating information for the calling routine.

9. A central processor as recited in claim 8 wherein the last instruction in a subroutine is a subroutine return instruction and wherein said control means includes means responsive to the subroutine return instruction for restoring the contents of said general registers saved in response to the subroutine mask and said program counter from the memory stack.

10. A central processor as recited in claim 2 wherein the operating information for the calling routine that is stored in the memory stack defines a portion of a block of locations and wherein said control means includes means for storing a predetermined value in another location in the block of locations as operating information for the subroutine.

* * * * *